US011258709B2

(12) United States Patent
Li et al.

(10) Patent No.: US 11,258,709 B2
(45) Date of Patent: Feb. 22, 2022

(54) DETECTING COMMUNICATION NETWORK INSIGHTS OF ALERTS

(71) Applicant: Meta Platforms, Inc., Menlo Park, CA (US)

(72) Inventors: Ying Li, Menlo Park, CA (US); Martinus Arnold de Jongh, Santa Clara, CA (US); Vincent Gonguet, San Francisco, CA (US); James Donovan, San Francisco, CA (US); Laurent Corigliano, Paris (FR)

(73) Assignee: Meta Platforms, Inc., Menlo Park, CA (US)

( * ) Notice: Subject to any disclaimer, the term of this patent is extended or adjusted under 35 U.S.C. 154(b) by 12 days.

(21) Appl. No.: 16/930,712

(22) Filed: Jul. 16, 2020

(65) Prior Publication Data

US 2020/0351201 A1     Nov. 5, 2020

Related U.S. Application Data

(63) Continuation of application No. 16/155,510, filed on Oct. 9, 2018, now Pat. No. 10,764,184.
(Continued)

(51) Int. Cl.
*H04L 12/801* (2013.01)
*H04L 12/26* (2006.01)
(Continued)

(52) U.S. Cl.
CPC .......... *H04L 47/11* (2013.01); *H04L 43/0894* (2013.01); *H04L 47/12* (2013.01)

(58) Field of Classification Search
CPC ....... H04L 47/11; H04L 43/0894; H04L 47/12
See application file for complete search history.

(56) References Cited

U.S. PATENT DOCUMENTS 9,432,865 B1 * 8/2016 Jadunandan .......... H04L 41/069
9,439,081 B1 * 9/2016 Knebl .................... H04W 16/18
(Continued)

FOREIGN PATENT DOCUMENTS

EP       2530870 A1    12/2012
WO    2016091292 A1     6/2016

OTHER PUBLICATIONS

Filip Turniski; Analysis of 3G and 4G Download Throughput in Pedestrian Zones (Year: 2016).*
(Continued)

*Primary Examiner* — Ricky Q Ngo
*Assistant Examiner* — Stephen N Steiner
(74) *Attorney, Agent, or Firm* — Baker Botts L.L.P.

(57) ABSTRACT

In one embodiment, the system identifies one or more geographic areas covered by a communication network. The system determines, for each identified geographic area, a congestion metric for the identified geographic area based at least on a difference between a first and second reference point on a network speed curve, wherein the network speed curve represents download speeds for a volume of traffic in the identified geographic area. The system identifies one or more network traffic congestions in one or more of the identified geographic areas based on a comparison of the respective congestion metrics of the identified geographic areas to a threshold congestion metric. The system sends, to one or more operators of the communication network, one or more alerts about the identified network traffic congestions.

20 Claims, 14 Drawing Sheets

Related U.S. Application Data

(60) Provisional application No. 62/699,312, filed on Jul. 17, 2018.

(51) Int. Cl.
  *H04L 47/11* (2022.01)
  *H04L 47/12* (2022.01)
  *H04L 43/0894* (2022.01)

(56) References Cited

U.S. PATENT DOCUMENTS

| | | | |
|---|---|---|---|
| 2013/0329552 A1* | 12/2013 | Carnero Ros | H04L 47/14 370/230 |
| 2015/0373574 A1 | 12/2015 | Gordon et al. | |
| 2016/0065419 A1 | 3/2016 | Szilagyi et al. | |
| 2016/0112894 A1 | 4/2016 | Lau et al. | |
| 2016/0174081 A1 | 6/2016 | Lau | |
| 2017/0078171 A1 | 3/2017 | Tapia et al. | |
| 2018/0242178 A1 | 8/2018 | Barton et al. | |
| 2019/0166606 A1* | 5/2019 | Kalderen | H04B 7/0842 |
| 2019/0356533 A1 | 11/2019 | Vasseur et al. | |

OTHER PUBLICATIONS

EESR for Application No. 21167072.4-1218, mailed on Jul. 19, 2021, 9 pages.

Turniski, et al., Analysis of 3G and 4G download throughput in pedestrian zones, Proceedings ELMAR-2013, Croatian Society Electronics in Marine—ELMAR, Sep. 12, 2016, pp. 9-12.

Ran, et al., Adaptation Logic for HTTP Dynamic Adaptive Streaming using Geo-Predictive Crowdsourcing, arxiv.org, Feb. 5, 2016, 11 pages.

International Search Report and Written Opinion for International Application No. PCT/US2018/067120, dated Apr. 23, 2019, 11 Pages.

Wang C., et al., "Identifying Persistent and Recurrent QoE Anomalies for DASH Streaming in the Cloud," 2017 IEEE International Conference on Cloud Computing Technology and Science, Dec. 28, 2017, pp. 263-271.

* cited by examiner

DETECTING COMMUNICATION NETWORK INSIGHTS OF ALERTS

PRIORITY

This application is a continuation under 35 U.S.C. § 120 of U.S. patent application Ser. No. 16/155,510, filed 9 Oct. 2018, which claims the benefit under 35 U.S.C. § 119(e) of U.S. Provisional Patent Application No. 62/699,312, filed 17 Jul. 2018, which are incorporated herein by reference.

TECHNICAL FIELD

This disclosure generally relates to communication network, and in particular, to detecting communication network insights of alerts.

BACKGROUND

Communication networks, such as fiber-optic networks, cellular networks, and broadband wireless networks, provide data communication channels for computing systems (e.g., a computer, a tablet, a smartphone) to communicate data and information, such as, text, images, videos, website content, etc. A geographic area covered by a communication network may be divided into a number of sub-areas (e.g., tiles, cells in cellular networks, regions such as a county, an area of a collection of cities, towns, village, etc.). Each sub-area may generate certain amount of network traffic and the communication network may provide connection services to any number sub-areas covered by the communication network. Users may access the communication network (e.g., using a computing device) for downloading and uploading data. The communication network may have a bandwidth to allow the users to use services supported by the communication network.

SUMMARY OF PARTICULAR EMBODIMENTS

Particular embodiments described here relate to a method of monitoring communication network performance (e.g., network traffic congestions, network coverage issues) and user experience (e.g., network speeds, network latency, signal status) of the end users of communication networks at both front-end and back-end. Particular embodiments of the system may detect network insights of alerts, such as network traffic congestions or network coverage issues in one or more geographic areas covered by a communication network. Particular embodiments may determine one or more network performance metrics for detecting network congestions. For example, the system may firstly identify, in a communication network, one or more areas that have relative high traffic volume. The system may determine, for each identified area, a first average network speed during busy hours of the communication network and a second average network speed during non-busy hours of the communication network. The system may calculate a ratio of the difference between the first and second average network speeds to the first or second average network speed and use the ratio as a network performance metric to gauge the network performance and the quality of the user experience in that area. As another example, the system may determine a congestion metric for each individual area based on reference points associated with a network speed curve (e.g., download speed vs. traffic volume or number of samples). The system may calculate the difference between average download speeds of a first reference point and a second reference point of the network speed curve. The first reference point may be a reference point representing an average or median of the download speed for the relatively flat portion of the download speed curve. The second point could be in the portion of the curve corresponding to the higher end of the traffic volume. The system may calculate a ratio of the difference of the two average download speeds at the two reference points to the average speed at the first or the second reference point and use the ratio as the network performance metric. The system may use a machine learning (ML) model to determine a threshold value for the network performance metric and compare the determined network performance metric with that threshold value. When the network performance metric is below the threshold value, the system may identify a network traffic congestion in that area. The system may rank a number of areas having network traffic congestions using the network performance metric and send congestion alerts to operators about the detected network traffic congestions. The congestion alerts may be ranked by one or more associated attributes including, for example, network performance metrics, locations, median download speed, regional download speed, cell identifications, etc. Particular embodiments of the system may determine one or more network coverage metrics (e.g., signal strength, number of connected towers, signal stability status) and compare the network coverage metrics to respective thresholds for detecting the network coverage issues, as network insights of alerts. Particular embodiments of the system may determine one or more quality of experiences related metrics (e.g., download speed, latency such as round trip time, upstream latency, downstream latency, download speed at busy hours, latency at busy hours, etc.) and compare the quality of experience metrics to respective thresholds for detecting the quality of experiences issues, as network insights of alerts. For example, if one of these quality of experiences related metrics is worse than needed or required threshold, or is among the worst certain percentage, then a quality of experience related issue or network insights of alert could be detected and reported. For another example, if a mapping function of one or multiple of the quality of experiences related metrics is worse than needed or required threshold, or is among the worse certain percentage, then a quality of experience related issue or network insights alert could be detected and reported.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Overview

Quality of Experience

Figure 1:
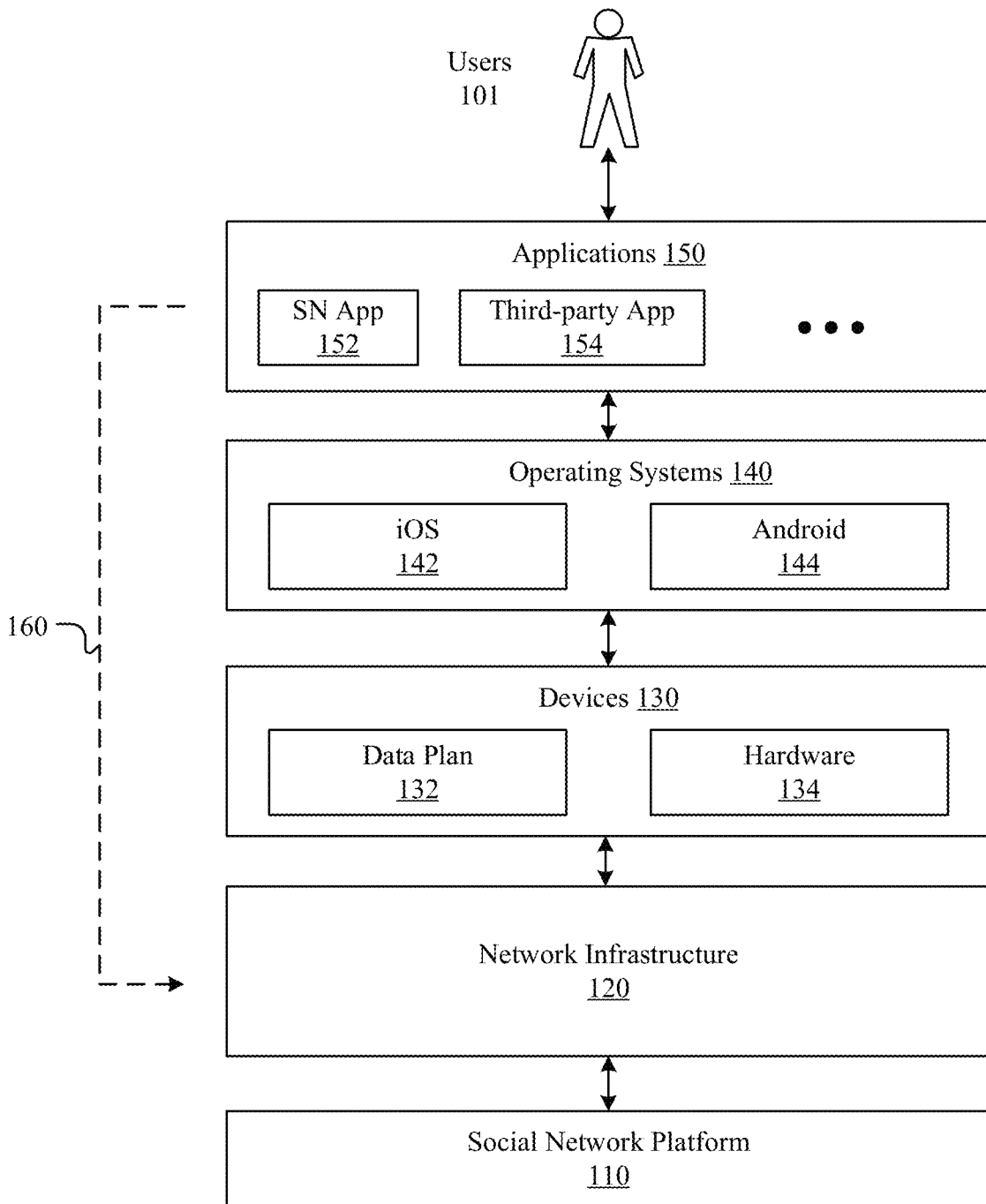
FIG. 1 illustrates an example system for optimizing network infrastructure based on application data.

Quality of experience (QoE) of end users or customers may be a general metric which indicates the degree of satisfactory of end users related to experiences of the applications or services they are using. For example, QoE could include the download speed, the latency, and other parameters, that are related to end users experience at the mobile application level. QoE could also be a metric derived from the download speed or latency (e.g., by a mapping function) to indicate end users satisfactory for the experience. QoE may be one of the most important factor for communication network planning, monitoring, diagnosis, or/and optimization. The mobile network operators (MNOs) of the communication networks may need to understand which geographic areas have unsatisfied QoE and what are the service types (e.g., live video streaming, high-definition video downloading) having low QoE. The MNOs may use this information to reduce the operating expenses (OPEX) (e.g., via reducing the complaints, tickets, lowering the network optimization cost) and to reduce the capital expenditures (CAPEX) (e.g., by most effectively pinpointing out where to add more cells and avoiding adding cells in unnecessary places) of the communication network. The MNOs could also use this information to recover or even boost the traffic volume (implying more revenue), which would have been suppressed due to unsatisfied QoE.

Furthermore, communication network engineering may need deeper insights understanding related to QoE. Such understanding could provide supporting inputs to MNOs for making decisions on whether to optimize the network and which aspect to optimize (e.g., whether to upgrade the network from current generation to next generation, whether to do the network expansion by adding more cells for cell densification, where to add cells) directly or indirectly based on QoE. Particular embodiments of the system may link QoE to wireless communication engineering by providing information about whether the QoE of end users of a particular area (e.g., a cell, a tile, a region) is healthy and what could be the causes for unhealthy QoE from wireless network perspective (e.g., coverage issues, capacity issues, latency issues, other issues). The coverage and the capacity of the communication network may be two of the most important aspects for cellular engineering to understand the status and healthiness of the network. Particular embodiments of the system may use the data collected at the application level to generate models for coverage issues and congestion issues. Particular embodiments of the system may provide a congestion alert model using QoE as a key factor for identifying congestions of the network and generating congestion alerts. Particular embodiments of the system may provide network change requests to the computing devices as an attempt to mitigate further network congestion.

Particular embodiments of the system may determine one or more QoE related metrics (e.g., download speed, latency such as round trip time, upstream latency, downstream latency, download speed at busy hours, latency at busy hours, etc.) and compare the QoE related metrics to respective thresholds for detecting the quality of experiences issues, as network insights of alerts. For example, if one of these quality of experiences related metrics is worse than the needed or required threshold, or is among the worst certain percentage, then a quality of experience related issue or network insights of alert may be detected and reported. For another example, if a mapping function of one or multiple of the quality of experience related metrics is worse than needed or required threshold, or is among the worse certain percentage, then then a quality of experience related issue or network insights of alert may be detected and reported.

Problems

Mobile network operators (MNOs) may monitor network traffic of a large number cellular towers (e.g., 100 k) at network infrastructure level and optimize network performance based on the monitored network traffic. However, the MMOs lack of means to detect network congestion and coverage problems for the large number of cells of cellular networks. Traditional methods of measuring network performance by driving a measurement vehicle around in the network is very inefficient and limited in capability. Furthermore, the optimization that only relies on network infrastructure level information has many limitations and could lead to suboptimal results. For example, although the MNOs may monitor network traffic (e.g., download speed, busy hours, traffic volume, tower performance) at network infrastructure level, this infrastructure level information may hide information about actual user experience and application usages at application level. The MNOs lack effective means to obtain data usage information related to network status (e.g., a high definition video downloading or live video streaming associated with a high traffic volume during busy hours, messaging associated with a low network traffic, etc.). Thus, the MNOs cannot associate network performance degradation with particular data usage and cannot identify the root causes of network problems at network infrastructure level. As another example, the MNOs cannot directly evaluate the QoE of end users because lacking of effective means to obtain or access application usage data at application level. When applications and network infrastructure are optimized separately, these optimizations may have suboptimal results and lack feedback information on the effectiveness and impact of the optimizations. As another example, the MNOs do not have access the network data of competitive carriers, and therefore lack competitive perspectives (e.g., competitor's network performance or/and optimization actions in particular areas) when optimizing the network at infrastructure level, which may lead to suboptimal network performance comparing to other competitors.

Solution

Particular embodiments of the system may collect application data of users (e.g., application names, application types, time duration, quality of experience, network speed, latency, network coverage) at application level and provide supporting and feedback information to the network infrastructure optimization (e.g., at infrastructure level) based on the collected application data. Particular embodiments of the system may detect network congestions in one or more areas covered by a network and send congestion alerts to the MNOs of the network as the basis for network optimization. Particular embodiments of the system may collect data (e.g., application data, network performance data) from networks of multiple carriers and provide competitive perspective to the MNOs when optimizing networks.

Benefits

Particular embodiments of the system address the limitations and shortcomings of existing network optimization technologies by providing improved technical solutions for monitoring and optimizing the network performance. Particular embodiments of the system may collect user experience data and network performance data at application level, generate network congestion alerts or network coverage alerts, and identify the root causes of the network performance degradation to support optimization of the network performance. Particular embodiments of the system enable network optimization (e.g., infrastructure level, application level) based on information from multiple layers of the system (e.g., both infrastructure level and application level) instead of information from one single layer only (e.g., infrastructure level only or application level only), and therefore enable better network optimization that are not possible before. Particular embodiments of the system may provide more effective optimization recommendations with reduced cost for improving the network performance. Particular embodiments of the system may directly evaluate the effectiveness of the network optimization by evaluating the quality of experience (QoE) of users based on the application data. Particular embodiments of the system may provide competitive perspectives for optimizing network in particular areas based on the application data collected cross the networks of multiple carriers. Particular embodiments of the system may provide faster and more accurate congestion detections for cells at a previously prohibitable large scale, enable more effective optimization of networks (e.g., upgrading capacity, tuning cellular towers, adding fiber links), and provide better QoE to end users of the networks.

Network Optimization System

FIG. 1 illustrates an example system 100 for optimizing network infrastructure based on application data. In particular embodiments, the system 100 may include a number of layers including, for example, a social network platform 110 (e.g., servers, databases), network infrastructure 120 (e.g., fiber networks, cellular towers, cable networks, switches), computing devices 130 (e.g., client devices, computers, smartphones, tablets), operating systems 140 (e.g., iOS 142, android 144), applications 150 (e.g., social network applications 152, third-party applications 154, operators' applications, carriers' applications), users 101, etc. The social network platform 110 may provide content and services to users 101 through the network infrastructure 120 and the computing devices 130. The computing devices 130 may include device hardware 134 (e.g., computers, smartphones, tablets) and may be associated with particular data plans 132 provided by one or more carriers. The computing devices 140 may include an operating system (e.g., iOS 142, android 144) and a number of applications 150 (e.g., social network applications 152, third-party applications 154) running on the computing devices 130. The users 101 may interact with the applications 150 running on the computing devices 130 to access the content and services provided by the social network platform 110. In particular embodiments, the system 100 may collect data (e.g., application names, application types, time duration, quality of experience, network speed, latency, total amount of data delivered, signal strength, number of connected towers, signal stability status, network coverage, etc.) from the applications 150 running on the computing devices 130 used by the users 101. The system 100 may collect the application data through one or more application programming interfaces (APIs) provided by the social network platform 110 or third-parity entities (e.g., network carriers, operating system providers, application developers, application service providers). The system 100 may use the collected application data for monitoring the network performance, such as, detecting network congestion or coverage problems. The system 100 may provide network insights 160 (e.g., congested areas, congest alerts, coverage alerts, network speeds, network latency, network performance, etc.) based on the collected application data for the optimization of network infrastructure 120. The system 100 may also provide feedback information (e.g., improvements on QoE, network speed, latency) for the optimization actions taken on the network infrastructure 120.

In particular embodiments, the system 100 may monitor the communication network performance (e.g., network traffic congestions, network coverage issues) based on the data from both front-end (e.g., user devices 130, applications 150, operating system 140, websites, search engines, etc.) and back-end (e.g., social network platform 110, network infrastructure 120, servers, switches, database, etc.) of the communication network. In particular embodiments, the system 100 may collect user experience data (e.g., network speeds, network latency, signal stability status) from both front-end and back-end of the communication network. In particular embodiments, the system 100 may use the data collected from the front-end (e.g., applications) to generate optimization recommendations for the back-end network infrastructures 120 or/and social network platform 110. In particular embodiments, the system 100 may use the data collected from the back-end (e.g., social network platform 110, network infrastructure 120) to generate optimization recommendations for the front-end user experience (e.g., applications 150, operating system 140, user devices 130, data plan 132, network speeds, latency, etc.). In particular embodiments, the system 100 may determine one or more network performance metrics (e.g., ratios based on average network speeds) and compare the network performance metrics to respective threshold values to detect network congestions in one or more areas covered by the communication network. In particular embodiments, the system 100 may determine one or more network coverage metrics (e.g., signal strength, number of connected towers, signal stability status) and compare the network coverage metrics to respective threshold values to detect the network coverage issues.

Congestion Detection Framework Overview

Figure 2:
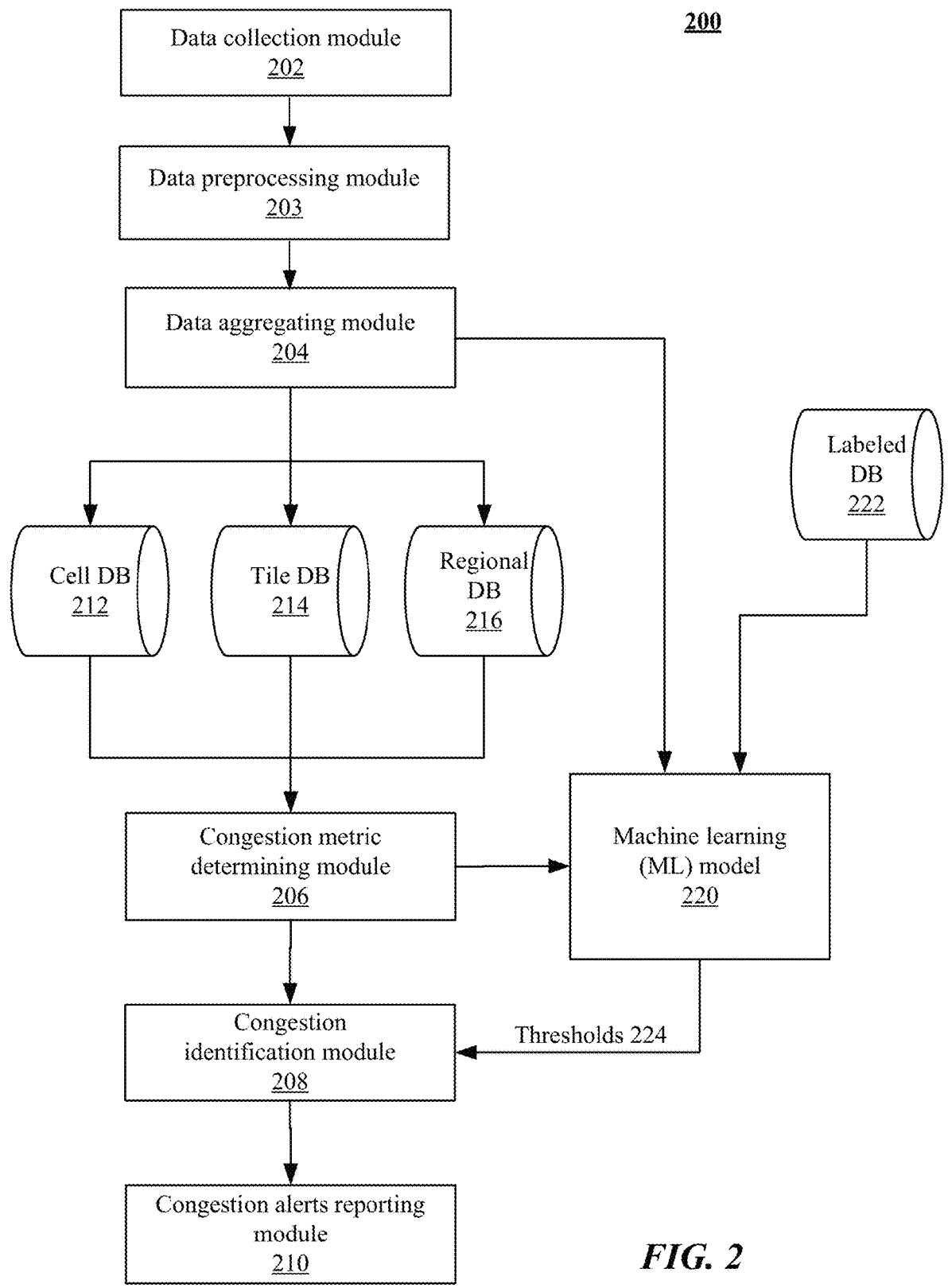
FIG. 2 illustrates an example framework for detecting network congestions.

FIG. 2 illustrates an example framework 200 for detecting network congestions. In particular embodiments, the framework 200 may be implemented on the social network platform 110 (e.g., social network servers) or third-party platforms (e.g., third-parity servers), which may coordinate with the network infrastructure 120 and user devices 130 to collect application data and detect network congestions. In particular embodiments, the framework 200 may include a data collection module 202, a data preprocessing module 203, a data aggregating module 204, a congestion metric determining module 206, a congestion alert identification module 208, a congestion alert reporting module 210, a machine-learning (ML) model 220, a number of databases (e.g., cell databases 212, tile databases 214, regional databases 216, labeled databases 222), etc. In particular embodiments, the data collection module 202 may collect raw application data for a number of computing devices (e.g., via APIs). Then, the collected data may be preprocessed by the data preprocessing module 203 and aggregated by the data aggregating module 204 into particular format (e.g., per hour per each individual day or per hour all days of a number days). The aggregated data may be stored in one or more databases (e.g., cell databases 212, tile databases 214, regional databases 216) or/and be fed to the ML model 220. For example, the data may be aggregated at tile level and each tile may have a side length of L and an area of L×L. In particular embodiments, the data may be aggregated at one or multiple tile levels. If the data is aggregated at cell level, the data may be stored in cell databases. If the data is aggregated at region level or polygon level, the data may be stored in regional databases. The aggregation process could utilize the data from the tile databases, which may include, for example, the mapping of the tiles to region, mapping of the cells to region, mapping of the tiles to cell, and the location (e.g., latitude, longitude) of the application requests. The aggregated data may be labeled manually by experts or automatically by algorithms and the labeled data may be stored in a labeled database 222 which may be used to train the ML model 220. The congestion metric determining module 206 may access the data stored in one or more databases (e.g., cell databases 212, tile databases 214, regional databases 216) and determine one or more network performance metrics based on the accessed data. In particular embodiments, the congestion metrics determining results from the congestion metric determining module 206 may be fed to the ML model 220 for training of the ML model. The congestion identification module 208 may identify one or more congestions in one or more areas of the network based on comparison of the network performance metrics and corresponding thresholds 224. The threshold 224 that are used to determine the congestions may be determined and fed to the congestion identification module 208 by the ML model 220. Then, the congestion alert reporting module 210 may generate congestion alerts and report these alerts to the MNOs. In particular embodiments, the generated congestion alerts may be ranked by one or more network performance metrics. The ranked list of the congestion alerts may be filtered and sent to the MNOs to help the MNOs to prioritize the detected congestions.

Data Collection and Aggregation

Identify High Traffic Cells

In particular embodiments, the system may use data collection module 202 to collect raw application data from the computing devices used by end users. The system may firstly identify a number of high traffic areas (e.g., cells, tiles, regions) in the network for further congestion detection in those areas. The high traffic areas may be identified based on a determination that one or more traffic metrics (e.g., traffic volume, total number of samples or total number of requests) in these areas are above corresponding pre-determined thresholds or above average traffic metric values of one or more other areas. In particular embodiments, the system may rank the areas of the network by one or more traffic metrics and identify the top M number of areas as the high traffic areas of the network. For example, the system may rank the cells of a cellular network by the number of requests of each cell and take the top M number of cells as the high traffic cells for further network congestion detection.

Data Collection

In particular embodiments, the system may collect raw application data (e.g., via APIs) in the identified high traffic areas (e.g., cells, tiles, regions) of the network. The data collected by the system may include information about, for example, how people are using the applications, how much time they spend using the applications, what are application names and types, how often the users come back to the applications, what is quality of experience (e.g., network speed, latency, network coverage), etc. In particular embodiments, the data collected by the system may include location-based network performance data, for example, network performance in particular areas of interest. The network performance data may include data representative of the network performance at the application level (e.g. traffic volume or demand volume or network speeds or network capacity, i.e. bandwidth), e.g. the network performance as experienced by the computing device, while executing an application. The data collected by the system may include competitor network performance, for example, network performance data of other carriers in the areas of interest. The raw application data may be logged based on requests from applications together with the time stamp associated which each application request. The collected data may include the cell identifications of serving cells that the user devices are connected, location information of user devices (e.g., via APIs when user approves and enables location-based services of the devices), carrier information (e.g., network providers), etc. The cell identification of each cell may be unique by containing concatenated information such as air interface technology type information. The collected data may include the counters related to the total bits of information delivered and the time spent for delivery of that information. The collected data may be used to determine one or more network performance metrics. For example, the counters of the total bits of the information delivered and the corresponding time spent for delivery of that information may be used to determine the download speed of the network.

In particular embodiments, the user devices may communicate with the social network platform through internet connections. The user devices may send communication request to and receive data from the social network platform back and force. In particular embodiments, the system may sample the requests with a particular sampling rate (e.g., one in one hundred). The system may record a number of matrix, which may include information about the number of devices that are connected, the number of requests from user devices, the time required for the requests to be received by the social network platform, the amount of data transmitted by the social network platform to the user devices, the time spent in transmitting that data to the user devices, etc. The system may determine, based on the collected data, a number of network parameters including, for example, the speed of connection (e.g., dividing the total bits processed by the time spent), the cells (e.g., cell identifications) that the devices are connected to, information of carriers, time, locations, types of devices, application versions, etc. The data may be continuously collected at the applications and may be periodically (e.g., daily or every several days) sent back to the social network platform for storage. The system may store the collected information in a database on which the system may run an information processing pipeline for detecting network congestions.

Data Aggregation

In particular embodiments, the system may use the data preprocessing module 203 to preprocess the collected raw data for data cleaning. Then, the system may use the data aggregating module 204 for data aggregating. The system may first filter and clean the collected data and then, may aggregate the data at different levels. For example, the system may aggregate the data by cells, tiles (e.g., squares describing geographic areas with different resolutions), or regions (e.g., zip-code regions, counties, provinces, states). After the data aggregation, the system may visualize the data set and use the aggregated data as inputs for network modelling. In particular embodiments, the system may store the aggregated data in different data bases. For example, the system may store the data aggregated by cells in the cell database 212. As another example, the system may store the data associated to or/and aggregated by tiles or locations in the tile database 214. The information associated with tiles may include, for example, identifications of cells related to the tiles, identifications of the tiles, tile sizes, identifications of carriers, metadata, network performance data, etc. As another example, the system may store the data associated to or/and aggregated by regions in the regional database 216. The data associated to the regions may include polygons representing regions, polygon identifications, collections of polygons, customized shapes representing regions, etc. A polygon in the regional database 216 may represent a region of any size, for example, a zip-code area, a settlement, a county, a town, a city, a state, a country, etc. The system may (e.g., through the data aggregating module 204 or congestion metric determining module 206) may access to all databases in including the cell database 212, the tile database 214, or/and the regional database 216 for determining the network performance for network congestion detection. Each database may be mapped to any other databases by the system. In particular embodiments, the system may aggregate the collected data periodically (e.g., every week or every several weeks). In particular embodiments, the system may collect, preprocess, and aggregate data in real time.

In particular embodiments, data aggregation may be performed for all application data related to all the devices associated with a particular cell. In particular embodiments, the data aggregation may be performed on the temporal dimension. As an example, the aggregated data can be per hour per each individual day. As another example, the aggregated data can be per hour all days of a duration of a number of days. The number of samples may be calculated for each unit of data of the aggregated data, for example, for data of every hour for each individual day, or data of every hour for a duration of N days (e.g., 7 days, 28 days). Alternatively, the system may calculate the total amount of bits delivered based on data aggregated for each hour each individual day, or each hour all N days. The system may use the number of samples or/and the total amount of delivered bits as indication of the demand volume and traffic volume of the communication network.

Computation Efficiency

In particular embodiments, the system may process huge amount of data collected from large scale communication networks. The system may calculate the network performance metric based on data points per hour per individual day. Depending on the data amount and number of samples, the computation based on data points per hour per individual day may require long computation time and large amount of computational resources. To improve the computation efficiency and reduce the computing time, the system may use the data points per hour all days of interest instead of per hour per individual day to calculate the network performance metrics. For congestion modelling at cell level, the network performance metric based on data points per hour all days can effectively enable the identification of the network congestion for a cell and has the advantages of computing simplicity for large scale networks. For time series analysis, the system needs to understand certain spike of the communication demand in a particular time window. The system may identify the cells that need time series analysis and perform the time series analysis for those cells based on data points per hour per individual day (because it includes more information in time domain).

Variations of Approaches

In particular embodiments, the system may perform congestion detections separately for weekdays, weekends, or holidays. In particular embodiments, the system may generate a congestion detection model based all the data collected during weekdays, weekends, or/and holidays. In other embodiments, the system may generate separate models based on data collected during weekdays, weekends, or holidays, respectively. The system may filter the data and exclude cells with small number of data samples (which represents low demand). For example, the system may exclude cells with the lowest 20 percentiles of the number of samples. This can reduce the computation and increase efficiency for congestion detection.

In particular embodiments, the system may remove an aggregated hourly data point if the number of the samples, from which this data point is aggregated, is below certain threshold. For example, for a particular hour near 3 AM of an individual day, the aggregated data point may correspond to a number of samples of 2. In other words, only 2 data samples (i.e., 2 requests) are logged during this particular hour. The system may determine that the number of sample is lower than a threshold (e.g., 5) for this particular hour of this particular day and may remove this aggregated data point from the further process of congestion metric derivation. As another example, if a particular hour near 3 AM aggregated from N days, the aggregated data point may correspond to a number of samples of 25. In other words, only 25 data samples (i.e., 25 requests) are logged during this particular hour of N days. The system may determine that this number of samples 25 is lower than a threshold (e.g., 30), and may remove this aggregated data point from the further process of congestion metric derivation.

In particular embodiments, the system may exclude cells which have data available only from limited number of hours (e.g., busy hours, non-busy hours, total number of busy hours and non-busy hours, or total number of hours). If the number hours of the available data is below certain threshold for a cell, the system may exclude this cell from further processes for congestion detection. For example, if none of the hourly data points is removed (as described in former sections), the system may have 24 hours data points if the aggregated data is per hour all N days. If some hourly data points are re moved, due to small number of samples used in aggregation, the system may have less than 24 data points (e.g., 10 data points) after removing those hours with small number of samples used in aggregation. The system may determine that the number of remaining data points (e.g., 10 data points) is lower than a threshold (e.g., 20 data points) and the system may exclude this cell from further processes of congestion detection.

In particular embodiments, the system may determine a confidence level score for the derivation of download speed when there are small numbers of samples. The confidence score may indicate the level of confidence on the estimation of the download speed. If the confidence is lower than a threshold, the system may exclude this cell from further processes of congestion detection. In particular embodiments, the system may use binning or average over the data points per given number samples to detect network congestion instead of using per hour per cell data points.

Congestion Metric

Model A: Ratio Based on Busy versus Non-busy Hour Network Speeds

Figure 3A:
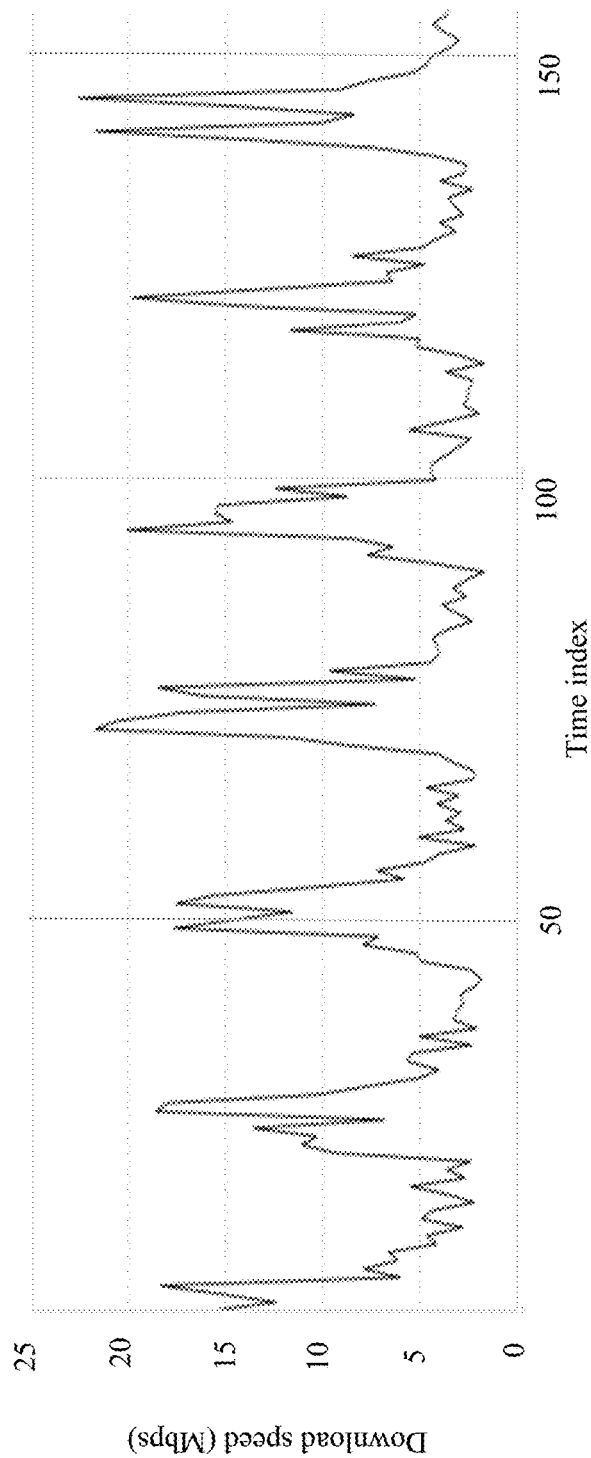
FIGS. 3A-C illustrate example data related to network download speed and total number of samples associated with a cell having network congestions.
Figure 3B:
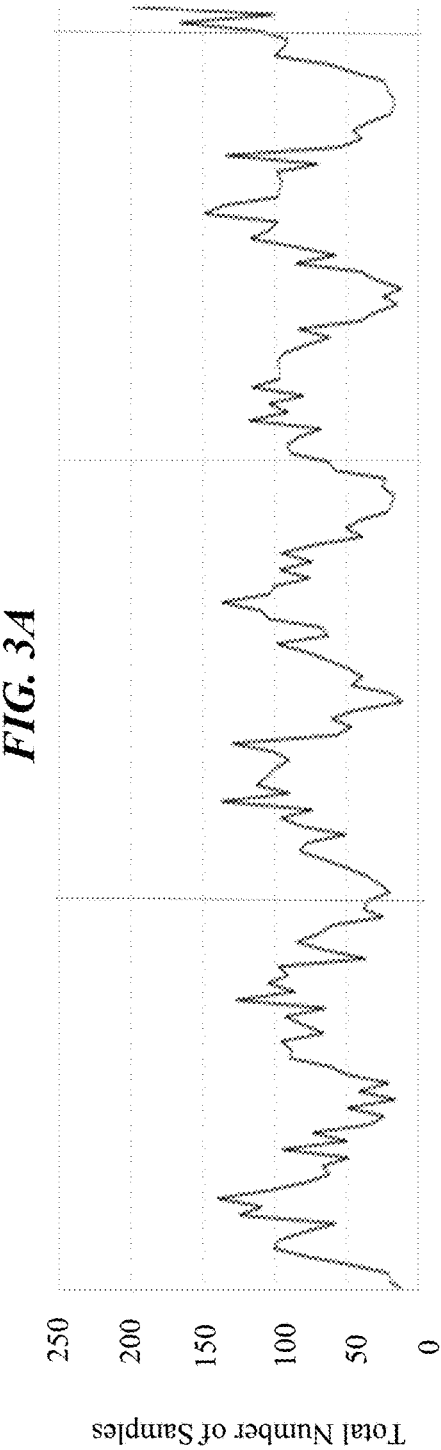
Figure 3C:
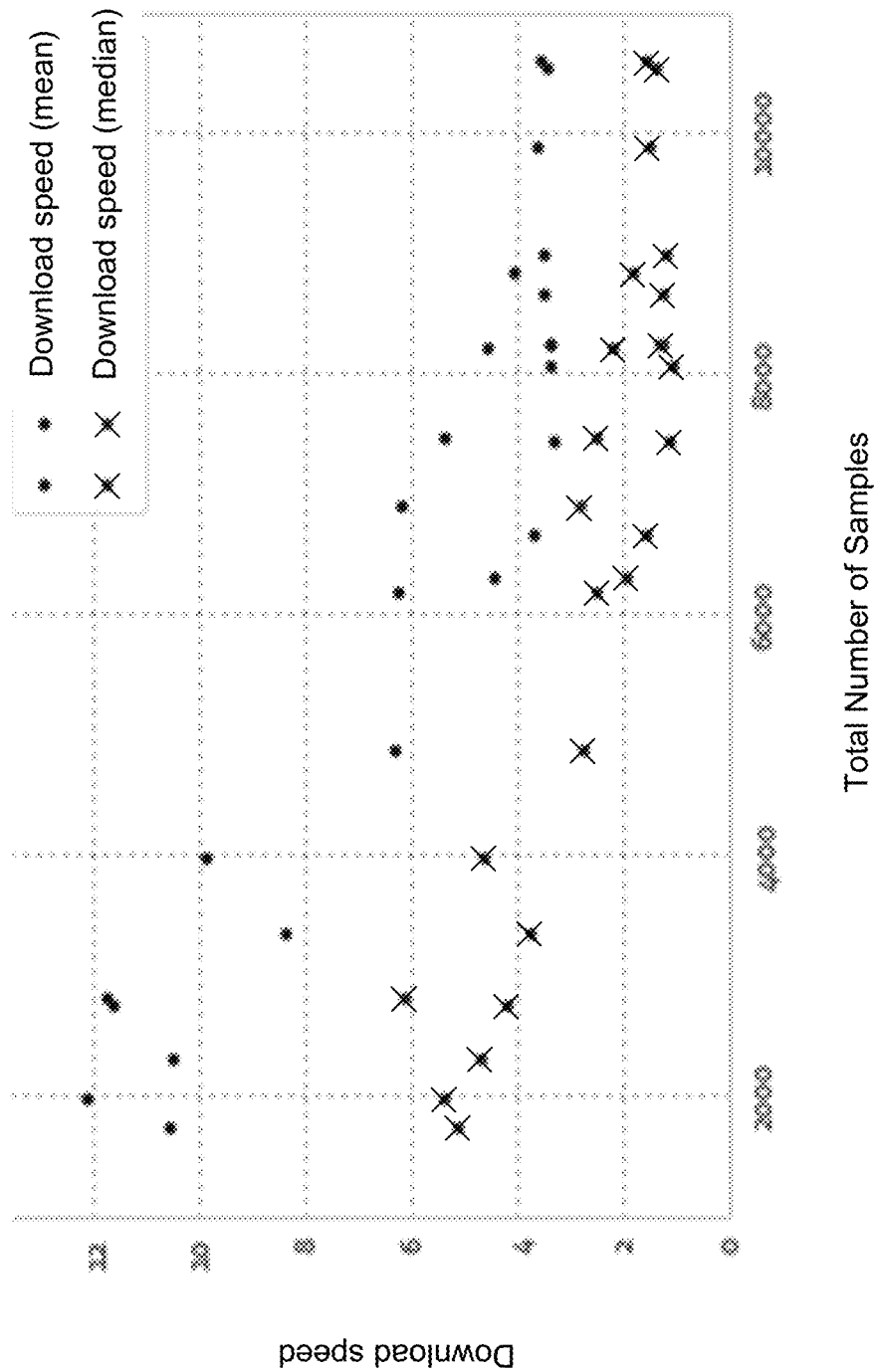

FIGS. 3A-C illustrate example data related to network download speed and total number of samples associated with a cell having network congestions. As illustrated in FIGS. 3A-B, the network speed and the total number of samples may be correlated and may vary over time. In general, a lower network speed may be correlated to a larger number of samples. As illustrated in FIG. 3B, the time windows that include a larger number of samples, which may indicate high demands for network connectivity, may be corresponding to relative busy hours. The time windows that include a smaller number of samples, may be corresponding to relative non-busy hours. The busy and non-busy hours may be determined based on the total number of samples over time. FIG. 3C illustrates the correlation between the network download speed and the total number of samples of this particular cell. In FIG. 3C, both the mean and median average download speeds are degraded when the total number of samples increases, and the download speed degradation may be used as a sign that the cell is likely to have network congestion.

In particular embodiments, the system may determine one or more network congestion metrics for detecting network congestions based on network speeds of busy and non-busy hours. The congestion metrics may indicate the degree of degradation of the network performance (e.g., network speeds) when one or more conditions change (e.g., total number of samples increasing). As an example and not by way of limitation, the system may first identify busy hours and non-busy hours for each individual cell. The busy hours could be the hours during which the communication network has the high traffic volume or demand volume. For example, the busy hours could be a certain percentile of the hours corresponding to the highest number of samples, or highest amount of information bits delivered. The percentile of the busy hours could be fixed or could vary depending on configuration. The non-busy hours, similarly, could be the hours during which the communication network has the low traffic volume or demand volume. For example, the non-busy hours could be a certain percentile of the hours corresponding to the lowest number of samples or lowest amount of information bits delivered. The percentile for non-busy hours may be fixed or may vary depending on configuration. In particular embodiments, the busy hours and non-busy hours may be determined by comparing the number of samples or network traffic volume to one or more threshold values. The threshold values may be fixed or may vary depending on configuration. In particular embodiments, the busy hours and non-busy hours may be determined by a machine-learning (ML) model which is trained by historical data.

In particular embodiments, after busy hours and non-busy hours are determined, the system may determine the network congestion metrics based on data of the busy and non-busy hours. For example, the network congestion metric may be a ratio as described in the following equation (Equation 1):

$$\text{ratio} = \frac{S_{busy\ hours} - S_{non\text{-}busy\ hours}}{S_{non\text{-}busy\ hours}} \quad (1)$$

where, $S_{busy\ hours}$ is average download speed at busy hours, $S_{non\text{-}busy\ hours}$ is average download speed at non-busy hours. Alternatively, the network congestion metric can be a ratio as described in the following equation (Equation 2), which is a negative of Equation 1. Note that Equation 1 could lead to a negative ratio value for the cell which is congested, while Equation 2 could lead to a positive ratio value for the cell which is congested.

$$\text{ratio} = -\frac{S_{busy\ hours} - S_{non\text{-}busy\ hours}}{S_{non\text{-}busy\ hours}} \quad (2)$$

In particular embodiments, the system may use the average download speed at busy hours as the denominator in Equations 1 or 2.

Model B: Ratio Based on Reference Points

In particular embodiments, the system may determine the network congestion metric for each individual cell based on reference points on a network speed curve (e.g., download speed vs. traffic volume or number of samples), as described in the following equations:

$$\text{ratio} = \frac{S_{reference\ Point\ A} - S_{reference\ point\ B}}{S_{reference\ point\ A}} \quad (3)$$

$$\text{ratio} = -\frac{S_{reference\ Point\ A} - S_{reference\ point\ B}}{S_{reference\ point\ A}} \quad (4)$$

where, $S_{reference\ Point\ A}$ is download speed at reference point A and $S_{reference\ Point\ B}$ is download speed at reference point B. The reference point A may be a reference point representing an average or median of the download speed for the relatively flat portion of the download speed curve (e.g., download speed vs. traffic volume or number of samples). For example, the relative flat portion of the download speed curve may be the curve portion that does not yet bend down for the download speed degradation over the traffic volume or the number of samples. In particular embodiments, the reference point may be in the non-busy hours. In particular embodiments, the reference point A may be not in the non-busy hours, rather, in some cases, it may have even higher download speed if the non-busy hours are already at the bent-down part of the download speed curve over the traffic volume. Such reference point A could be identified using the hourly data per individual day. Reference point B could be within busy hours or could be in the portion of the curve corresponding to the higher end of the traffic volume. In particular embodiments, the system may use the download speed at reference point B as the denominator in Equations 3 and 4.

Average Speeds

In particular embodiments, the average download speed at busy hours (as used in Equations 1 and 2) could be mean, median (i.e., percentile-50 or p50), or mode of the download speed of the busy hours. The download speed of the busy hours may be based on aggregated per hour all days download speed. The aggregated per hour all days download speed could also be mean, median, or mode of all the download speed samples. There are many combinations that could be used for determining the average download speed of the busy hours. Some examples of the possible combinations are described as following:

TABLE 1

| Average Speed | Description |
| --- | --- |
| Mean_Median | Take mean of all the samples of the download speed, then take median of the download speed of busy hours |
| Mean_Mean | Take mean of all the samples of the download speed, then take mean of the download speed of busy hours |
| Median_Median | Take median of all the samples of the download speed, then take median of the download speed of busy hours |
| Median_Mean | Take median of all the samples of the download speed, then take mean of the download speeds of busy hours |

Similarly, the average download speed for non-busy hours may also be determined based on many combinations similar to that as described above.

Figure 4:
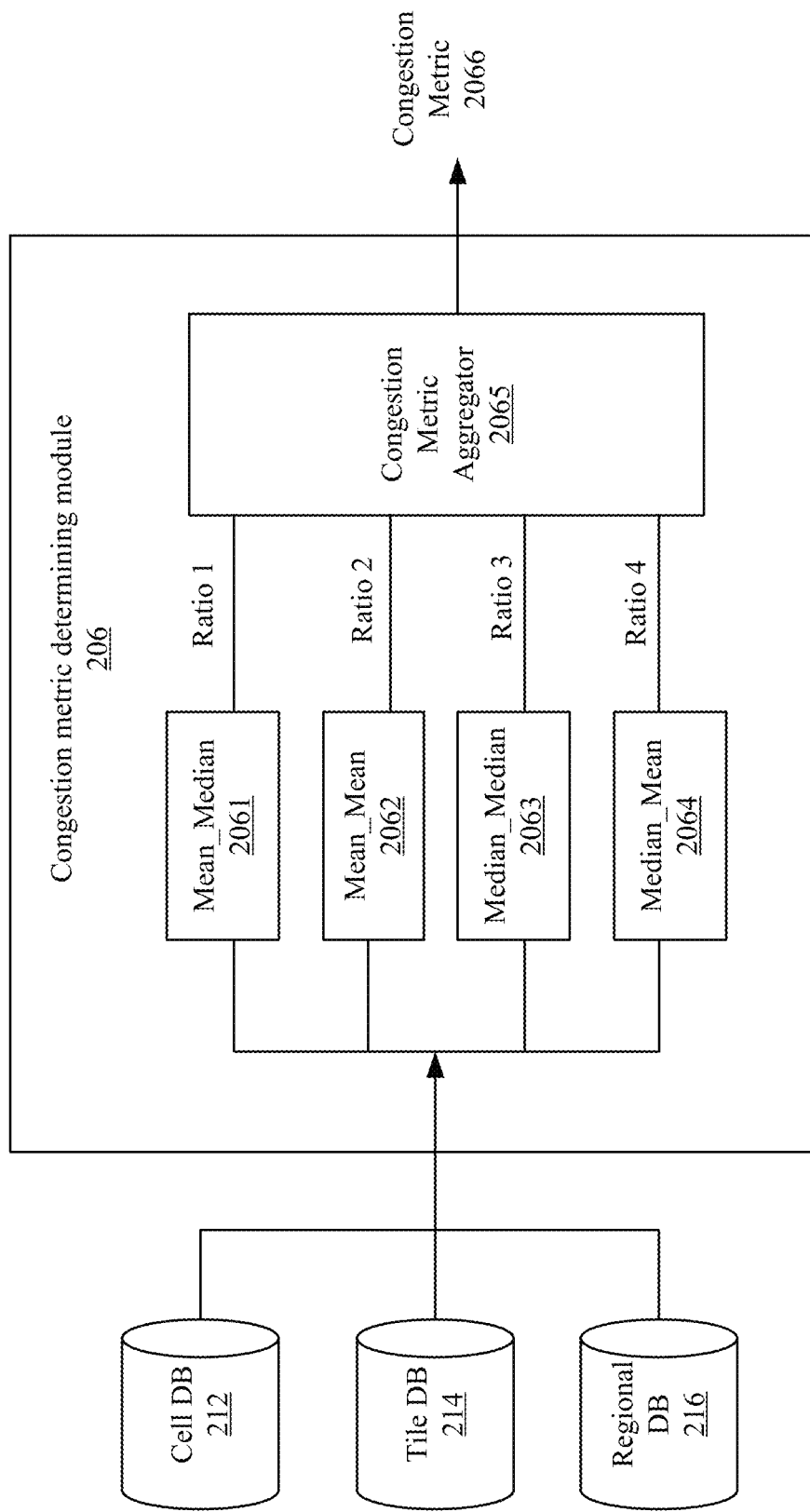
FIG. 4 illustrates an example congestion metric determining module which determines congestion metrics based on different average network speeds.

FIG. 4 illustrates an example congestion metric determining module 206 which determines congestion metrics based on different average network speeds. The congestion metric determining module 206 may access the databases (e.g., the cell database 212, the tile database 214, the regional database 216) and calculate multiple ratios based on the possible combinations of different average network speeds. For example, for each of the four combinations (e.g., mean_median 2061, mean_mean 2062, median_median 2063, median_mean 2064) as listed in Table 1, the congestion metric determining module 206 may calculate four ratios including ratio_1, ratio_2, ratio_3, and ratio_4. For each of these ratios, either Equation 1 or 2 may be used for the calculation. Then, the congestion metric determining module 206 may use the congestion metric aggregator 2065 to determine the congestion metric 2066 based on an average or weighted average of one or more of the calculated ratios (e.g., ratio_1, ratio_2, ratio_3, ratio_4). For example, the congestion metric aggregator 2065 may use the average of these four ratios to determine a more robust congestion metric 2066, as described in the following equation:

$$\text{Congestion Metric}=\text{average (ratio\_1,ratio\_2,ratio\_3, ratio\_4)} \quad (5)$$

Alternatively, the congestion metric aggregator 2065 may determine the congestion metric 2066 based on any number of ratios of the four ratios. For example, the congestion metric aggregator 2065 may use an average of two ratios to determine the congestion metric as following:

$$\text{Congestion Metric}=\text{average (ratio\_3,ratio\_4)} \quad (6)$$

As another example, the congestion metric could be weighted sum of these four ratios, and if the weight is zero for a certain ratio, then that ratio is not included in the congestion metric.

In particular embodiments, the system may determine the congestion metric based on average of multiple ratios (e.g., ratio_3, ratio_4) using Equations 2 and 6. The multiple ratios (e.g., ratio_3, ratio_4) may be calculated using the different type of average download speeds for busy hours and non-busy hours. For example, the average speed of busy hours for the first ratio (e.g., ratio_3) may be calculated based on median speeds of busy hours which are determined based on median speeds of all samples of the download speed. The average speed of the non-busy hours for the first ratio (e.g., ratio_3) may be calculated based on median speeds of non-busy hours which are determined based on median speeds of all samples of the download speed. As another example, the average speed of busy hours for the second ratio (e.g., ratio_4) may be calculated based on mean speeds of busy hours which are determined based on median speeds of all samples of the download speed. The average speed of non-busy hours for the second ratio (e.g., ratio_4) may be calculated based on mean speeds of non-busy hours which are determined based on median speeds of all samples of the download speed. The system may compare the congestion metric (e.g., average ratio determined by Equation 6) to a threshold (e.g., 0.18) and detect network congestion when the average ratio is above or equal to the threshold.

In particular embodiments, the system may include a network performance metric database. The network performance metric database may be associated with the cell database, the tile database, and the regional database (polygon database). The system may allow users of the system to query the database to obtain the corresponding network performance metrics. In particular embodiments, the regional congestion metric could be also derived in alternative ways, for example, from the tile-level congestion metric, or from the cell-level congestion metric, instead of directly from all the samples within the region. For example, the regional congestion metric can be a median or an average of all the congestion metrics of all the cells within this region, or a median or an average of all the congestion metrics of all the tiles within this region. In this disclosure, congestion metric may be interchangeable to congestion indicator.

Congestion Detection

Congestion Detection Rules

In particular embodiments, the system may (e.g., using the congestion identification module) compare the network performance metric (e.g., congestion metric) to a threshold value to detect network congestion based on a number rules. For example, if the system detects, for a particular cell, the congestion metric determined by Equation 1 is below or equal to a first threshold (e.g., −18%, i.e., −0.18), the system may determine that the cell includes a network congestion and may send an alert to the operator. As another example, the system may determine, for a particular cell, that the congestion metric determined by Equation 2 is above or equal to a second threshold (e.g., 18%, i.e., 0.18), the system may mark the cell as having a congestion and send an alert to inform the operator. In particular embodiments, the threshold values that are used to determine network congestions may be positive or negative values depending on the network performance metrics determined by different equations. In particular embodiments, the threshold value that are used to determine network congestions may be a maximum threshold value or a minimum threshold value depending on the network performance metrics.

Threshold Determination by Machine-learning Model

In particular embodiments, the system may detect network congestion based on a number of rules and one or more thresholds for the network performance metric. The thresholds may be determined by binary classification such as a congestion-analysis machine-learning (ML) model trained by pre-labeled network congestion data. The pre-labeled network congestion data may include information whether there are congestions in the cells of the network. The data can be manually labeled by engineers in the fields or engineers who are manually monitoring or observing the cells (to see whether the cells have congestions or not). The ML model may use supervised learning to learn to how to determine congestion metric thresholds. The ML model may be trained by network congestion metrics or other metrics derived from the aggregated data. The ML model may determine the congestion metric thresholds based on the supervised learning from the pre-labeled data. The ML model may use classification methods (e.g., decision trees) to generate the congestion metric thresholds or conditions for categorizing network traffic status into multiple categories (e.g., congested and non-congested categories). In particular embodiments, the ML model may generate conditions (e.g., multiple thresholds) which can classify network traffic status to more than two categories and each category may have different levels of congestion severity.

In particular embodiments, the ML model may use classification tree from scikit-learn package. For example, the manually labeled cell data may include at least 400 cells in total (e.g., 315 cells labeled as congested, 85 cells labeled as not congested). For the top cells that have the heaviest total traffic per day, more congestions may be expected to be identified among these cells. The system may be trained based on the top 100 cells with an initial threshold of the ratio which is less than −0.185, which may be adjusted later by the ML model to balance precision and recall rate. In general, the ML model may have more accurate threshold when trained by more manually labeled cell data. In particular embodiments, the ML model may use a single feature for ranking purpose and robustness and use binary classification to determine the threshold. The ML model may provide more flexibility for quickly determining the threshold and for extending for more complicated features or multiple features. In particular embodiments, the threshold may also be adjusted manually. In particular embodiments, the system may use the threshold of −18% for the network congestion alerts, which is relatively aggressively recommending improvements for cells due to congestion alerts.

Alert and Report

Alerts Filtered for Prioritization

In particular embodiments, upon detection of network congestions, the system may send one or more congestion alerts to the MNOs reporting the detected network congestions and the related cells having these congestions. The alerts may include all the cells having congestions or only a part of cells having congestions (e.g., the cells with the most severe congestions). The system may rank the cells based on their congestion severity as indicated by the network performance metrics and send a ranked list of the cells to the MNOs. Alternatively, the selection of the cells to be reported can be based on geographic region, radio access network technology information (e.g., 2G, 3G, 4G, etc.), carriers, network speeds, number of samples, etc. For example, the system may select a certain number of cells with the most severe congestions, or certain percentile of the cells for each operator, each network generation, or each geographic region, or each country, etc. In particular embodiments, the system may use multiple thresholds to filter the detected congestions. For example, the system may have a first threshold of congestion metric (e.g., worst 6 percent) per operator, per country, per network generation and a second threshold of congestion metric (e.g., worst 5 percent) per operator, per region, per network generation. These two thresholds may be different and may be applied on top of each other. For example, the system may apply two filters based on the two thresholds respectively. The MNOs may have many network metrics associated with a large number of cells (e.g., 100 k) to track and consider for optimizing network performance. The large number of metrics could make it very difficult for the MNOs to make optimal decisions. In particular embodiments, the system may generate network models based on the collected application data and use the models to help the MNOs to make better decisions. In particular embodiments, the system may filter the generated congestion alerts to generate an end list to help the MNOs to prioritize the congestion alerts. The congestion alerts may be filtered by usage cases (e.g., video streaming, sharing content, messaging, reading news feeds, gaming, etc.), congested cells, cells with coverage issues, problem devices, costs to fix, etc. In particular embodiments, the ML model may be used for smart filtering to decide which cells should be prioritized for fixing or optimization. In particular embodiments, the filtering methods described herein may be applied to other metrics different from the congestion metric. For example, for cell coverage alerts, the system may filter out the cells with signal strength among the worst 5 percent per region, per network generation, per operator, and generate alerts based on these cells. As another example, the system may filter out the cells and generate alerts based on the following conditions: (1) the cell's signal strength is among the worst 5 percent per region, per network generation, per operator, or (2) the cell's signal strength among the worst 6 percent per country, per network generation, per operator. The cell's signal strength can be defined based on the median or 50-percentile value of all the signal strength samples within the corresponding cells, where the data may be collected at the social network application level.

In particular embodiments, the system may take into consideration the occurrence rate (e.g., per weekly basis) of the alerts in a certain period of time from temporal perspective when filtering the alerts. For example, among all the latest N weeks, if there are M alerts happening, the occurrence rate of the alert can be determined by M/N. The system may define a filter based on the occurrence rate of the alerts and a threshold, such as, the occurrence ratio of the alert being above a threshold value (e.g., 0.3, 0.5, etc.).

In particular embodiments, a score may be calculated for an alerted cell based on the difference of the metric of the alerted cell, comparing to a metric average (e.g., regional average, country average, etc.). For example, the score may be calculated using the following equation:

$$\text{Score} = (\text{Metric of the alerted cell} - \text{Average metric}) / \text{Average metric} \qquad (7)$$

where the metric of the alerted cell can be signal strength, congestion indicator, etc., and the average metric may be a regional average, country average, etc. In particular embodiments, the system may determine an importance related weight for an alerted cell based on the total number of samples in a certain period of time (e.g., the recent week or latest N weeks). If a cell has a larger number of samples, the cell may have a greater weight, and the weight value may depend on the total number of samples. In particular embodiments, the system may filter alerts based on the importance related scores, and/or weighted scores, and the weight may indicate the total number of samples in the alerted cell. Although the filtering above is described in the context of congestion alerts, the filtering may be applicable to other suitable types of alerts.

User Interfaces

Figure 5A:
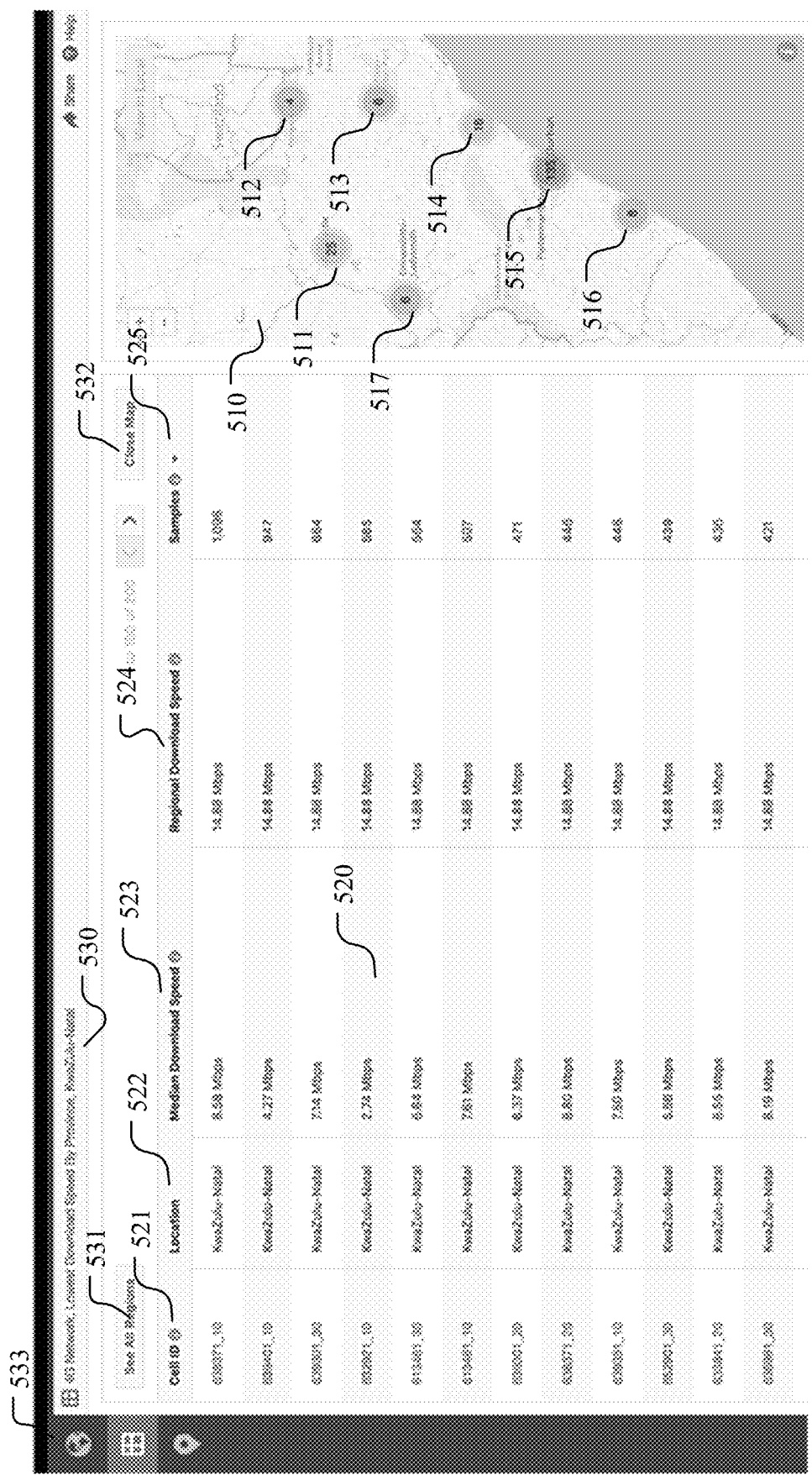
FIGS. 5A-F illustrate user interfaces of the system for detecting network congestions and reporting the congestion alerts.

FIGS. 5A-F illustrate user interfaces of the system for detecting network congestions and reporting the congestion alerts. As illustrated in FIG. 5A, the user interface 500A of the system may include a map 510 showing the areas that have network congestions (e.g., 511, 512, 513, 514, 515, 516, 517). Each area that has network congestion may be indicated by a circular indicator and a number within the circular indicator. Each area may be associated one or more cells. Each cell may include one or more cell towers and each cell tower may include one or more cell sectors. In particular embodiments, the number in the circular indicators may indicate the number of detected congestion alerts in the associated area. In particular embodiments, the circular indicator may be displayed with different colors to indicate the severity of the network congestions. The user interface 500A may further include a table 520 showing a list of cell alerts indicating the cells with network congestions or cells with different network speeds. Each row of the table 520 may include a cell alert and each column of the table 520 may be corresponding to a supporting attribute associated with the cell alert (e.g., cell identification 521, location 522, median download speed 523, regional download speed 524, number of samples or requests 525, etc.). The user interface 500A may further include a header section 530 indicating the current query (e.g., 4G network, lowest download speed by Province, KawaZulu-Natal) and a number buttons (e.g., 531, 532, 533). The button 531 may be used for specifying the regions that will be displayed in the user interface 500A. The button 532 may be used for closing the map 510. The buttons 533 may be used to switch between different display modes (e.g., table view, map view, location view). The list of cell alerts in the table 520 may be ranked by one or more of the associated attributes. For example, the list of cell alerts in 500A may ranked by the number of samples from the highest to lowest. In particular embodiments, the list of cell alerts may be ranked by other attributes, such as, cell identifications 521, locations 522, median download speeds 523, regional download speed 525, congestion indicators 590 (shown in FIGS. 5D-F), regional congestion indicators 591(shown in FIGS. 5D-F), etc. When the user of the system selects a particular cell alert, the user interface 500A may display further detailed information about the cell (e.g., from the cell database) and other information associated with the cell alert.

Figure 5B:
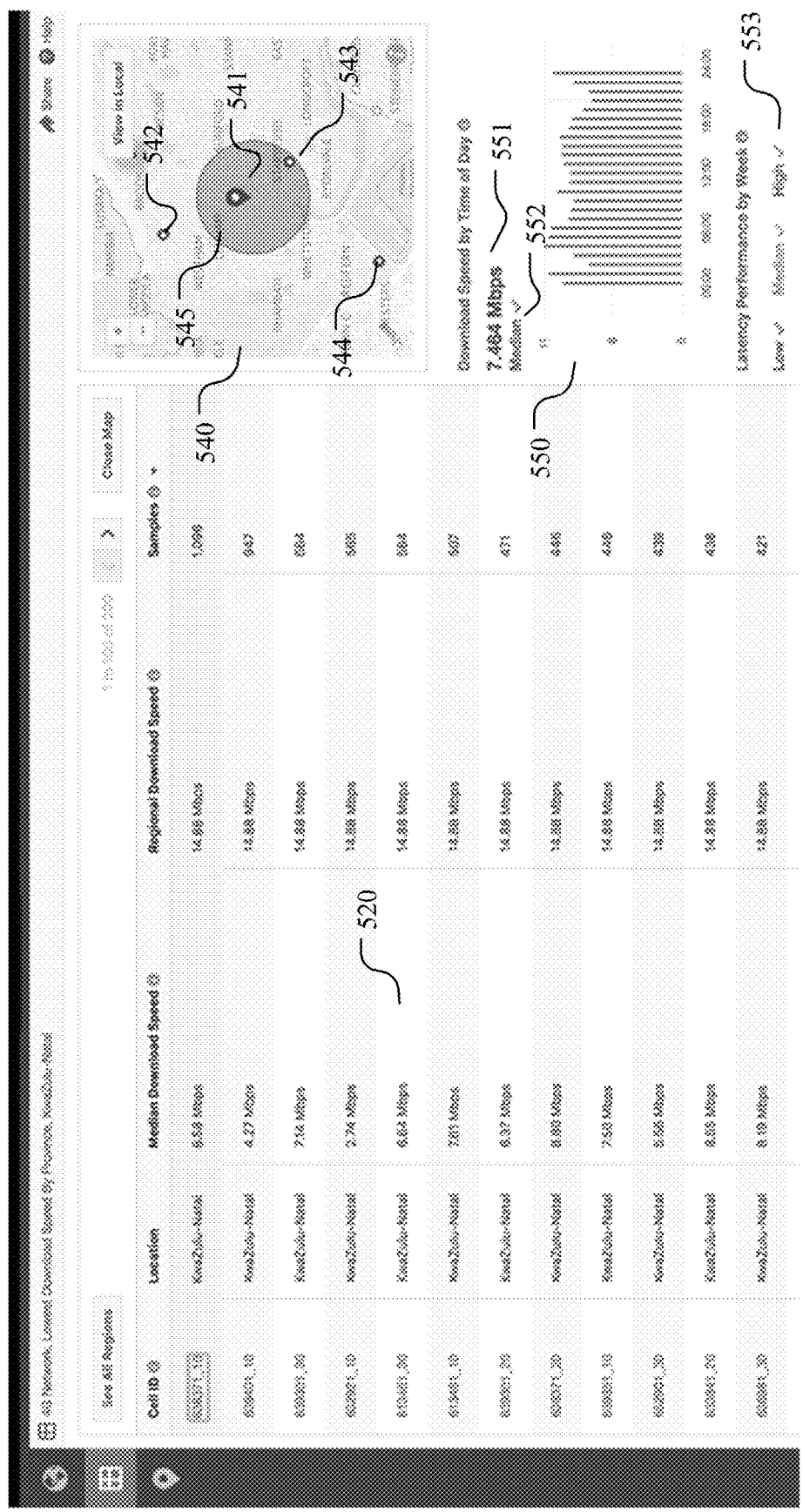

As illustrated in FIG. 5B, the user interface 500B may include the table 520, a map 540, and a chart 550. Similar to user interface 500A, the table 520 may be used to display a list of cell alerts for network congestions. The map 540 may display a number of locations (e.g., 541, 542, 543, 544) associated with network congestion alerts. The user interface 500B may allow users to define an area of interest 545 in the map 540 and display the associated information (e.g., download speed by time of day) in a separate chart 550. The user interface 500B may be configured through an interactive drop-down menu 552 to display network performance information, for example, the median download speed 551 (e.g., 7.464 Mbps). The chart 550 may display the network download speed in a bar chart over time of day. In particular embodiments, the user interface 500B may allow the user to specify other information 553, for example, latency performance by week as categorized by low, median, high performance, to be display in other charts (not shown).

Figure 5C:
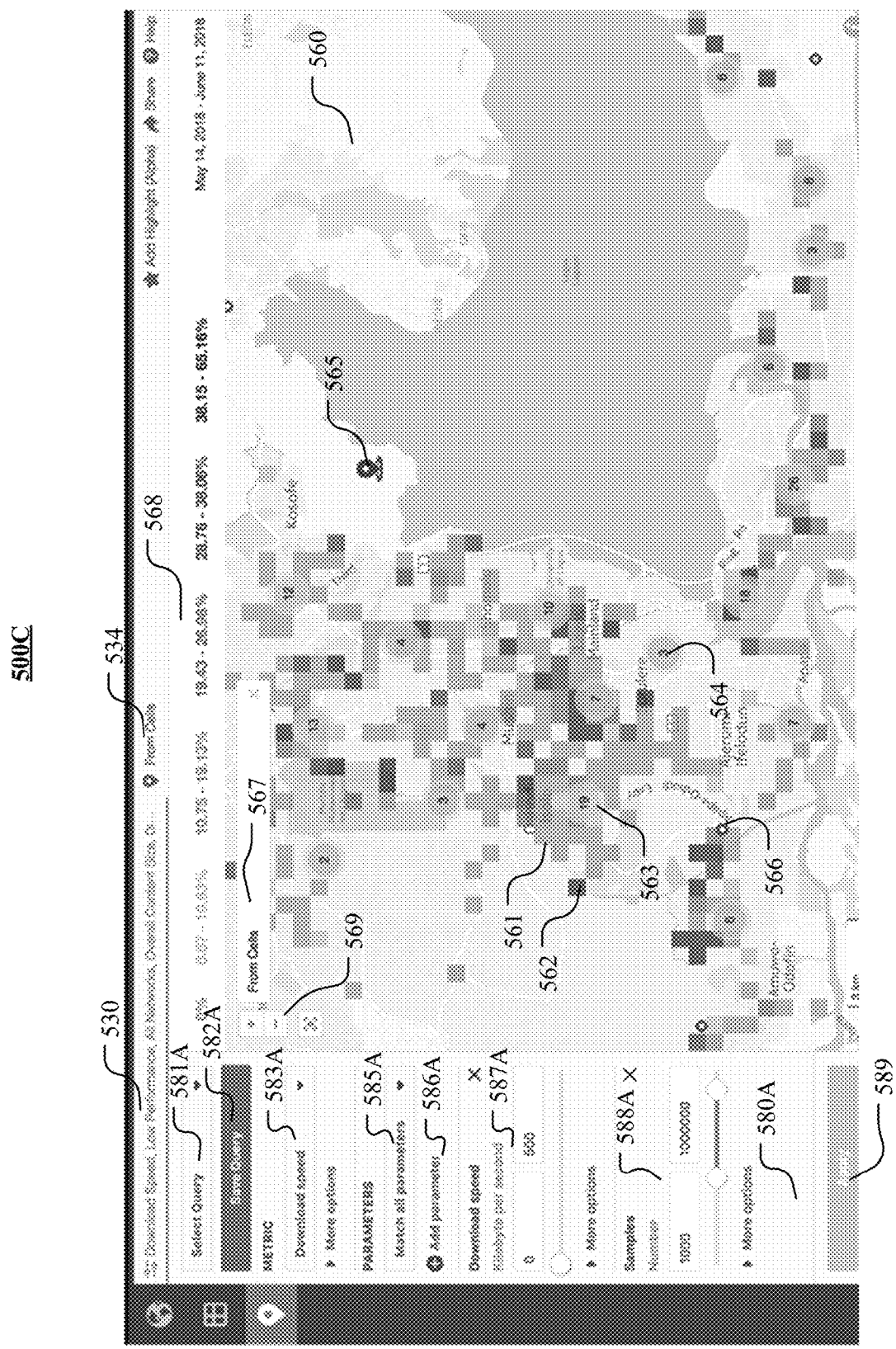

As illustrated in FIG. 5C, the user interface 500C may include a map 560 displaying a number map tiles (e.g., 561, 562), a number of congested areas (e.g., 563, 564), a number of locations of interest (e.g., 565, 566), etc. In particular embodiments, map tiles may be displayed in different colors to indicate the status of the network performance in each map tile. The congested areas may be indicated by circular indictors each with a number inside indicting the number of congestion alerts or the number of congested cellular towers. The map may be used to analyze the network performance associated one or more locations of interests (e.g., 565, 566). The user interface 500C may further include a header section 568 displaying the percentile of congestion of different colors associated with map tiles (e.g., 561, 562). The user interface 500C further include a search bar 567 which may receive query keywords to search in the map 560. The map 560 may further include a number buttons 569 to allow users to navigate or zoom in or out the map 560. In particular embodiments, the user interface 500C may include configuring panel 580A allowing users to input or configure the query for the system. For example, the users of the system may select a query from a number of pre-defined or pre-stored queries via the drop-down menu 581A to query the system. The users of the system may save the current query using the button 582A. The users of the system may input or configure the queries by setting download speed thresholds through the drop-down menu 583A, setting matching parameters through the drop-down menu 585A, adding new parameters through button 586A, setting download speed ranges by inputting number or scrolling the control bar of the control element group 587A, setting the ranges of the number samples by inputting number or scrolling the control bar of the control element group 588A, or/and applying the configuration to the query through the button 589A. The circular indictors each with a number inside may use the number to indicate the number of alerts which are not limited to congestion alerts. For example, the number may indicate the number of coverage alerts or the number of cells with coverage alerts. As another example, the number may indicate the number of cells with low download speed alerts. In particular embodiments, each type of alert could be displayed on an individual page. In particular embodiments, if there are composite alerts associated with multiple metrics, the multiple types of alerts could be shown on the same page.

Figure 5D:
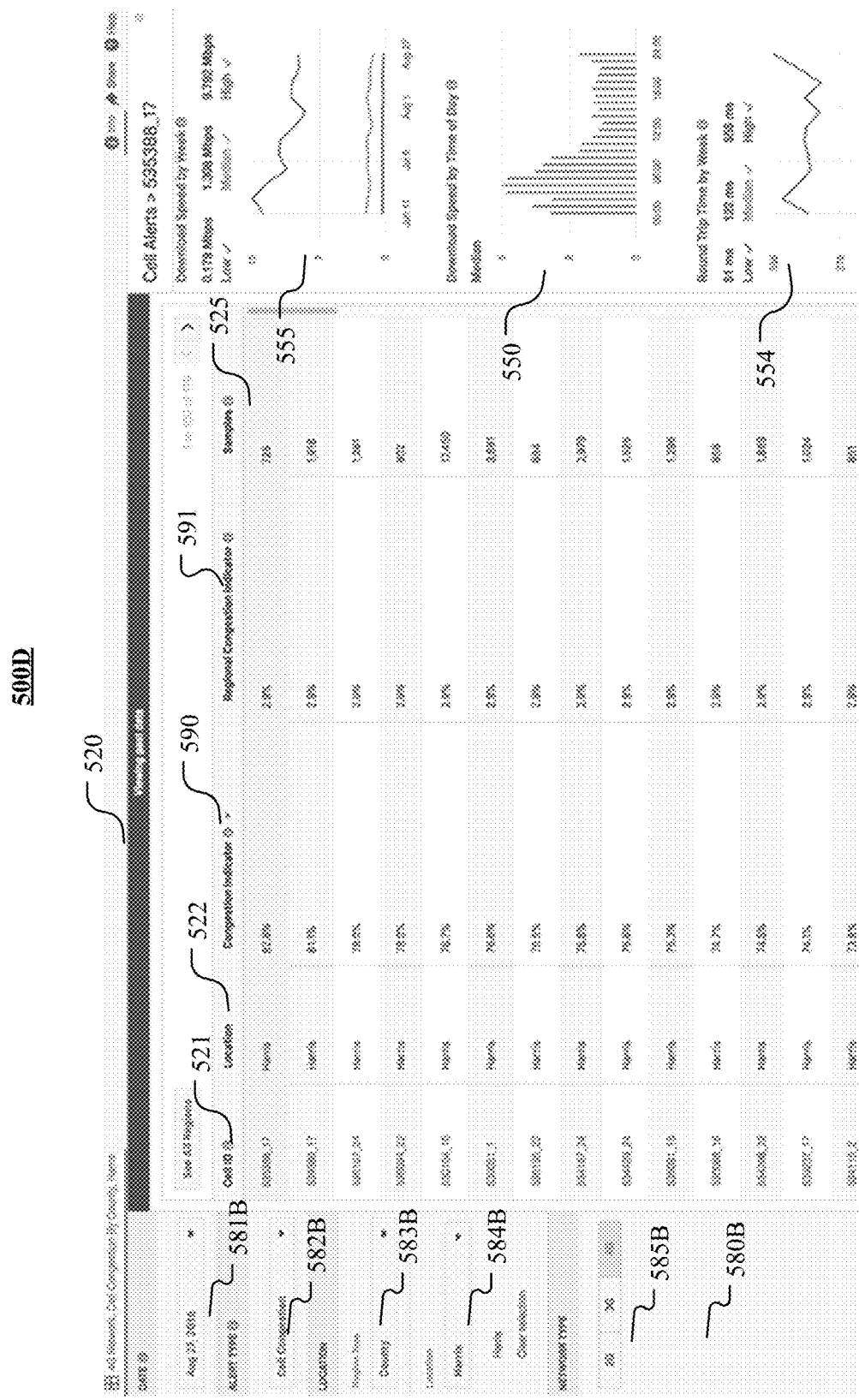
Figure 5E:
Figure 5F:
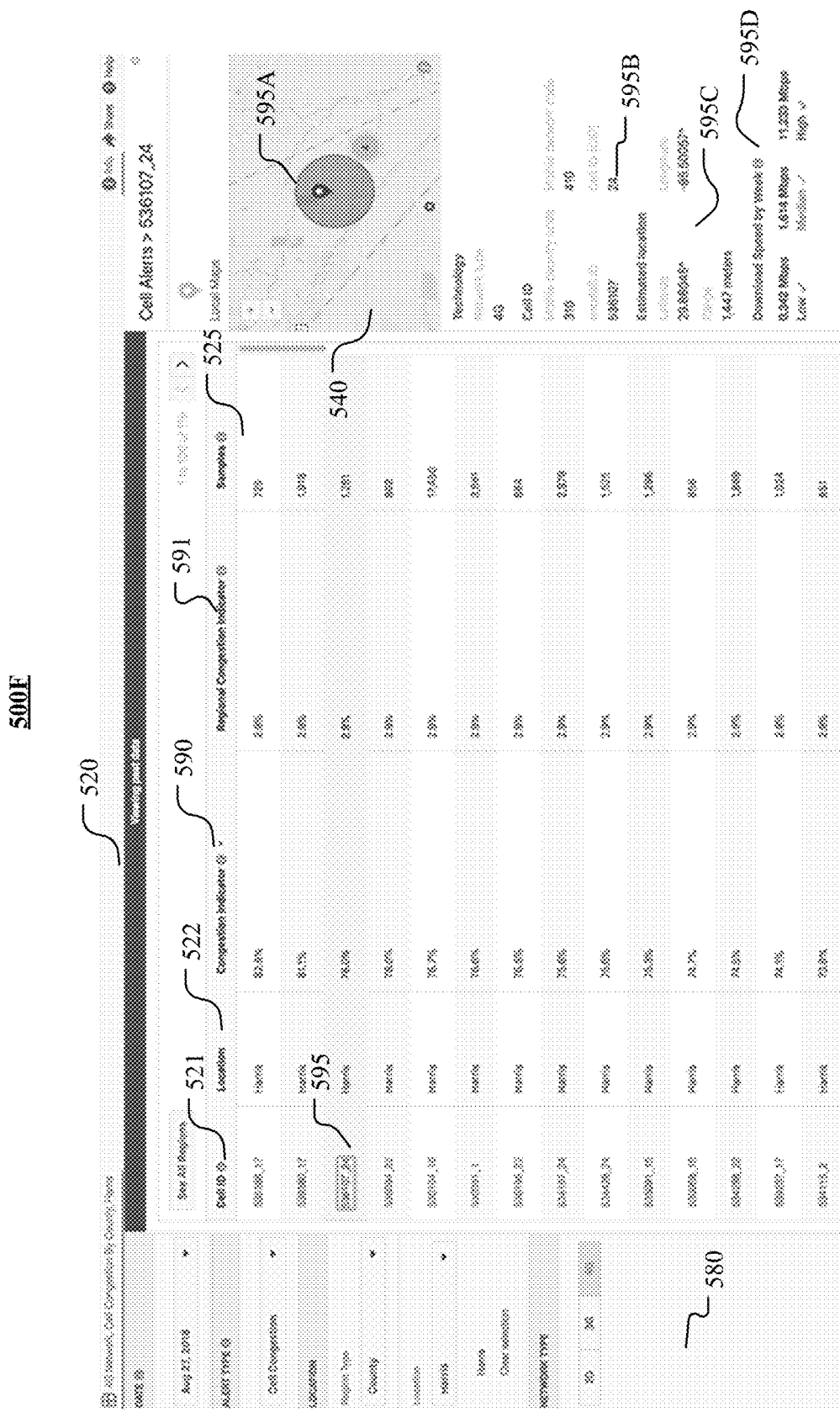

As illustrated in FIG. 5D, the user interface 500D may include the configuration panel 580B, the table 520, and the charts (e.g., 550, 554, 555), etc. The configuration panel 580 may include a number of drop-down menus (e.g., 581B, 582B, 583B, 584B) and segmented buttons (e.g., 585B) allowing users to configure or select displayed content according to different attributes, for example, date, alert type, location, region type, network type, etc. The table 520 may have a number of rows and columns. Each row of the table 520 may include a cell alert and each column of the table 520 may be corresponding to a supporting attribute associated with the cell alert (e.g., cell identification 521, location 522, congestion indicator 590, regional congestion indicator 591, number of samples or requests 525, etc.). The user interface 500D may further include the chart 550 for displaying download speed by time of day using bar charts, the chart 555 for displaying the download speed by week, the chart 554 for displaying network latency metric (e.g., round trip time). FIG. 5E illustrates a user interface 500E, which may include the configuration panel 580B, the table 520, and a map 593. The map 593 may display an area of interest 593A (e.g., configured through the configuration panel 580B) corresponding to the currently displayed network congest alerts in the table 520. The map 593 may include a number of network congestion indicators (e.g., 593B, 593C) corresponding to the network congest alerts in the table 520. FIG. 5F illustrates a user interface 500F displaying an alerted cell 595 being selected in the table 520 which displays a list of cells with congestions. Once the alerted cell 585 is selected, the user interface 500F may display the corresponding areas 595A in the map 540. The user interface 500F may further display other information related to the selected cell 595, for example, cell identification 595B, location 595C, download speed by week 595D, etc.

In particular embodiments, the system may assign values to each map tile to provide benchmarking context to the users of the system. The map tiles may be displayed on the map overlapping the cells covered by networks. The map may display data as aggregated through and normalized by regions or locations. In particular embodiments, the system may display information of relative network performance (e.g., comparing with other carriers) in the areas of interests. In particular embodiments, the system may focus on areas with high number of samples or requests, which indicate the high demand for the network connectivity in those areas and high likelihood that these area worth further investments. In particular embodiments, the system may help MNOs to prioritize the network performance metrics to make better decisions for network optimization or upgrading.

Alert Database

In particular embodiments, the system may include a cell alert database which may store all the cell alerts that are generated by the system for particular queries. The cell alert database may have a standard scheme which may be consistent across all alerts. The cell alert database may include different types of cell alerts including, for example, congestion alerts, coverage alerts, network speed alerts, etc. The cell alerts may have a number of associated attributes including, for example, associated cells, associated polygons, associated raking scores based on network congestion metrics, etc. The cell alerts reported to the MNOs may be filtered to include only the high important alerts and may be ranked by one or more associated attributes. The cell alerts may further include supporting attributes (e.g., root cause analysis results) to explain why a certain cell alert have a high or a low ranking score. For example, the supporting attributes may include the values of the network congestion metrics (e.g., ratios as described by Equations 1-6) as explanation for the ranking score the cell alerts. As another example, the supporting attributes may include the root cause analysis results which may indicate that the network performance degradation is caused by the large number of user requests.

In particular embodiments, the system may include a portal which is associated with the cell alert database and network metric database. The portal may provide logging information about cells of interest, for example, information showing the cell status change over time. The portal may generate events associated with the cells of interest and store these events in an event database, which can be used as supporting inputs to the cell alerts. In particular embodiments, the event database may be used to train a machine-learning (ML) model which can associate specific actions (e.g., optimization actions) with the improvements of the network performance. The knowledge gained form the event-based learning may be used to further improve the system for optimizing network performance. The event data may further include information related to user feedback, such as, flags, thumb up, thumb down, etc., which may provide useful feedback for the system optimizing network performance.

Root Cause Analysis

In particular embodiments, the system may perform root cause analysis for the detected congestion or coverage problems. In particular embodiments, the root analysis may be performed using heuristic projection algorithm. In particular embodiments, the root cause analysis may be performed using a machine-learning model which is trained based on historical data. For example, the system may determine that the congestion problem is caused by a broken fiber because a lot of cells along a certain fiber link have congestion problems. As another example, the system may determine that the congestion is caused by a problematic cell tower because all other areas around the tower have no congestion problem and the cell covered by this particular tower has congestion problem. In particular embodiments, the system may perform the root cause analysis at sector level. For example, the system may determine that a particular antenna sector has an antenna titling problem because its corresponding area in a particular angle of the antenna sector is the only area has a coverage problem.

Optimization Recommendations

In particular embodiments, the system may generate recommendations for upgrading the network (e.g., upgrading capacity, moving to 4G/5G, tuning cellular towers, tuning antenna angles, adding more sectors, adding fiber links, shifting investment to right bucket, strengthening fiber backhaul) based on a priority score determined by the system. For example, the system may recommend prioritizing upgradation on the cells having the more severe congestion or coverage problems. As another example, the system may recommend shifting investment to optimize the aspects of the network that can be most effective to improve the network performance and help MNOs to make better decision for improving the network performance with a limited investment budget. In particular embodiments, the system may perform or recommend optimization (e.g., at platform level, infrastructure level, device level, or application level) based on information of the user devices (e.g., data plans, device models, device speeds, operating system versions). For example, the system may filter the user devices by data plans or device models and provide customized services to those devices to enable the users the have best possible user experiences. As another example, the system may filter out the user devices (e.g., non-compatible device models) that cannot support user experiences meeting a minimum quality standard for certain services (e.g., high-resolution videos, resource-consuming effects) and may not provide these services to these devices. As another example, the system may filter out locations (e.g., areas, cells, regions) where the network performance cannot provide user experience meeting a minimum quality standard and may not provide the non-supported services to those locations until the network performance is optimized or improved. In particular embodiments, the system may generate network optimization and plans for long term optimization/planning (e.g., upgrading network to 4G/5G, adding fibers, strengthening fiber backhaul), short term optimization/planning (e.g., tune tower antenna angles, balancing demands and capacity), or real time optimization/planning (e.g., providing customized services based the status of the network and user devices). In particular embodiments, the network performance may be optimized based on one or more performance parameters including, for example, a load balancing factor, a handover, or a throughput. The network performance may be optimized by aggregating communication networks of different carriers or providers.

In particular embodiments, the optimization recommendation may be performed using heuristic projection algorithm. In particular embodiments, the optimization recommendation may be performed using a machine-learning (ML) model which is trained based on historical data. When MNOs take actions to fix or optimize network with congestions, the related data and actions may be stored in a database to train the ML model. The ML model may fine tune the future recommendations for different use scenarios based on the training by the historical action data or/and the monitored impact of the actions. The ML may predict the outcome of certain optimization actions and may weigh the importance of congestion alerts based on the expected outcome or the possible outcome of possible optimization actions.

Real-Time Optimization

In particular embodiments, the one or more servers of the computing system may send one or more network change requests to one or more computing devices. These network change requests may result in a computing device displaying a message for the user, suggesting to change the current network, or may interact with the operation system or an application of the computing device to automatically change the current network. This would allow a network to offload some of its users to another communications network, e.g. another cellular network or a broadband wireless network. The interaction of the network change requests with the computing device may depend on computing device settings, e.g. a user might prohibit automatic network changes or only allow certain applications to change the network they use. Such network change requests would allow for a real-time optimization of a communications network, they also could be timed or include point in time information or expiration information to optimize the network in a time-based fashion, e.g. offload computing devices for and during planned maintenance windows.

Other Network Performance Metrics

In particular embodiments, the network performance metrics may include congestion metrics, coverage metrics, or/and network speed metrics. The congestion metric for a cell may be based on the average download speeds of busy hours and non-busy hours (e.g., as described in Equations 1 and 2). The coverage metric of a cell may be based on the network signal strength, number of connected towers, or/and signal stability status of that cell. The network speed metric of a cell may be based on one or more networks speed, such as, the highest network speed of a time period, the lowest network speed of a time period, or the average network speed of a time period (e.g., mean, median, mode). In particular embodiments, the system may suppose that a lower metric value (e.g., weaker signal strength, lower network speed) indicates worse network performance. In particular embodiments, the system may suppose, for some network performance metrics, that a higher metric value indicates worse network performance. The system may compare the network performance metric to a threshold to determine network congestion or network coverage issues. The threshold may be corrected and normalized based on sample volume (e.g., less sample points may need a higher bar for detecting congestion or coverage issues). The congestion and coverage issues detection may be based on empirical data of the network and are scalable to communication networks of any scales.

In particular embodiments, the system may compare the network performance metric (e.g., download speeds, ratios, signal strengths) of a cell to that of a regional average (e.g., for a region covering or associated with that cell) to evaluate the network performance for that cell. In particular embodiments, the system may provide empirical-based bias corrections on sample values to handle the cases where the number of samples may be very small or large. The empirical-based bias correction may be scaled to any level needed by the system. In particular embodiments, the system may use a temporal change (e.g., a drop) of one or more network performance metrics for determining network performance (e.g., detecting congestion and coverage issues). For example, the system may detect a drop of network performance (e.g., indicated by congestion metric) comparing to the average performance over a period of time (e.g., 12 weeks). The system may identify a congestion issue or coverage issue when the drop is greater than a threshold. In particular embodiments, the system may model the actual network behaviors, for example, worst performance, peak-performance, peak-to-worst performance comparison, peak-to-peak performance comparison, etc. In particular embodiments, the system may detect network congestions based on trends (e.g., determined via linear regression) of the network performance.

In particular embodiments, the system may determine a correlation between a quality of experience metric and a network demand metric and may predict a time for a future network traffic congestion in the one or more geographic areas based on the correlation of the quality of experience metric and the network demand metric. In particular embodiments, the system may detect the network congestions by determining whether the download speed is degrading (and how much is the degradation, if any) in an area when the total traffic volume of the network increases or is higher than a threshold in that area. In particular embodiments, the system may predict a network congestion in an area based on the collected data or/and historical data of the network in that area or other areas. For example, the system may use a machine-learning model, which is trained by historical data of that area or many other areas, to predict the network congestion and determine when the network congestion would happen.

In particular embodiments, the system may perform time series analysis to determine a temporal domain anomalous event (e.g., a sudden spike of network traffic of particular day or time windows) related to the network traffic in one or more selected areas covered by the communication network. For example, the system may compare a network traffic volume in the areas to an average network traffic volume of these areas or one or more other areas and identify a sudden spike of network traffic when the network traffic volume is higher than the average network traffic volume by a threshold multiplying factor (e.g., 2 times, 3 times, 5 times). In particular embodiments, the identification of temporal domain anomalous events may be based on network traffic data points per hour per individual day of a number of days which may include more information than the network traffic data points of per hour all days aggregating a number of days.

Example Method

Figure 6:
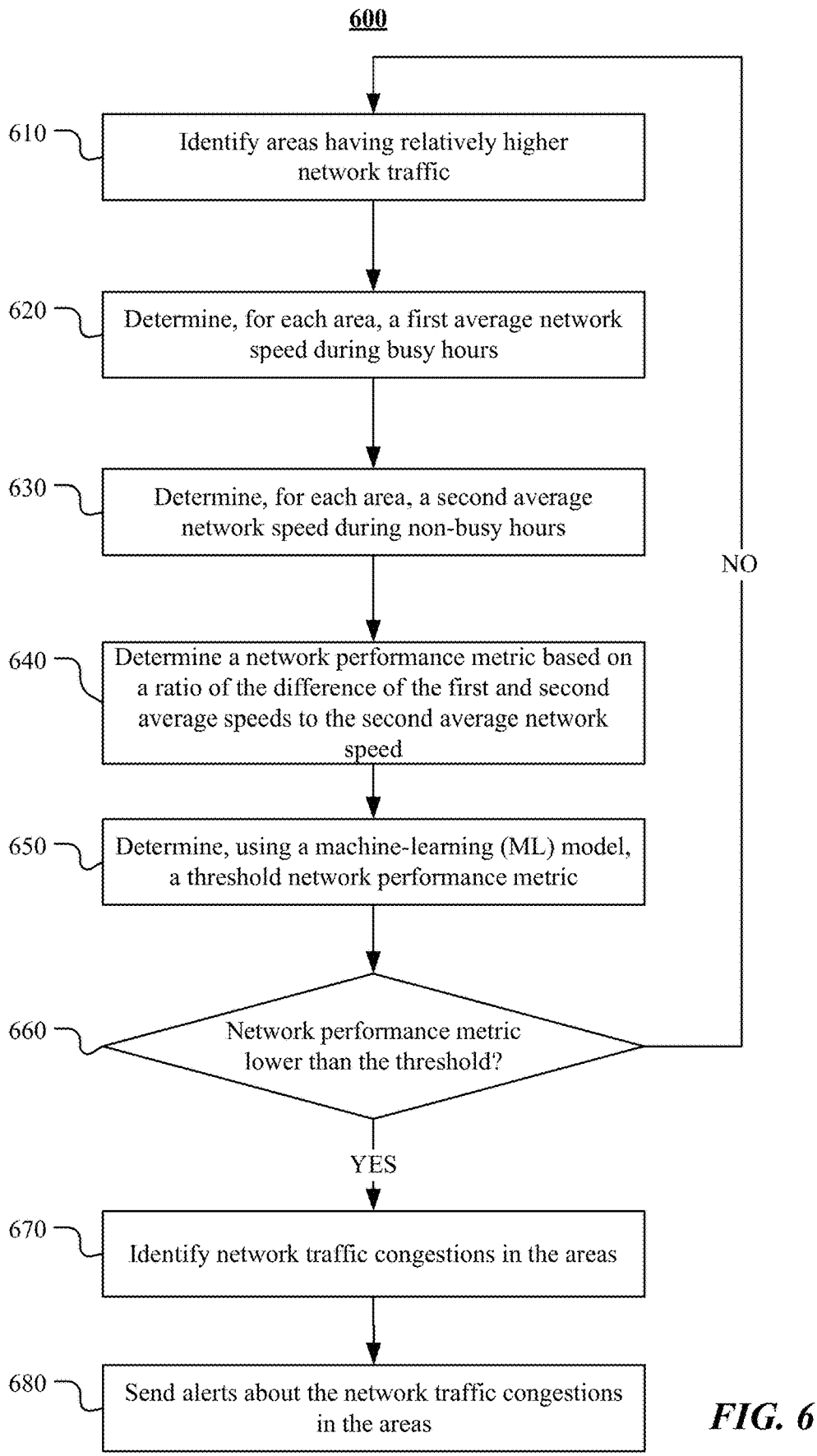
FIG. 6 illustrates an example method for detecting network traffic congestions in geographical areas covered by a communication network.

FIG. 6 illustrates an example method for detecting network traffic congestions in geographical areas covered by a communication network. In particular embodiments, the areas may be cell areas in a cellular network or other geographic areas covered by the communication network. At step 610, the system may identify one or more areas covered by the communication network and the identified areas may have relative higher network traffic volume than other areas in the communication network. In particular embodiments, the high network traffic volume areas may be identified based on a determination that the network traffic volume in those areas is higher than a pre-determined threshold volume or network traffic volume of other areas.

At step 620, the system may determine, for each identified area, a first average network speed during busy hours (or busy time periods) of the communication network in that area. At step 630, the system may determine, for each identified area, a second average network speed during non-busy hours (or non-busy time periods) of the communication network in that area. In particular embodiments, the first and second average speeds may be a mean speed, a median speed, or a mode speed of corresponding hours or time periods. In particular embodiments, the first and second average speeds may be determined based on network traffic data points per hour per each individual day of a number of days. In particular embodiments, to reduce the required computation resources (e.g., CPUs, time, memory), the first and second average speeds may be determined based on network traffic data points per hour all days aggregating a number of days. The network traffic data points per hour all days may include aggregated network speeds which may be a mean speed, a median speed, or a mode speed of corresponding time periods (e.g., hours) aggregated from a number of days. In particular embodiments, the first and second average network speeds may be determined based on network traffic data points during a number of prior time periods (e.g., minutes, hours, days). In particular embodiments, the busy hours or busy time periods of the communication network in that area may be determined based on a determination that the communication network traffic volume is higher than a threshold volume for busy hours during those hours or time periods. The non-busy hours or time periods may be determined based on a determination that the communication network traffic volume is lower than a non-busy hour threshold volume during those hours or time periods.

At step 640, the system may determine a network performance metric based on a ratio of the difference between the first and second average network speeds to the first or second average network speed. In particular embodiments, the network performance metric may be used to indicate the severity of the network traffic congestions. In particular embodiments, the network performance metric may be based on linear regression slopes of network speeds and a majority voting on the slopes. At step 650, the system may determine a threshold network performance metric using a machine learning (ML) model which may be trained by manually labeled network traffic congestion data. In particular embodiments, the ML model may include a classification model or a tree model. In particular embodiments, the threshold network performance metric may be adjusted by the ML model or manually to balance a precision metric and a recall rate related to network traffic congestion identification.

At step 660 the system may compare the determined network performance metric (e.g., the ratio) to the threshold network performance metric determined by the ML model. At step 670, when the network performance metric is lower than the threshold, the system may identify a network traffic congestion in that area. In particular embodiments, the system may identify network traffic congestion in multiple areas and rank those areas by congestion severity as indicated by the network performance metric. At step 680, the system may send one or more alerts to operators of the communication network about the identified network traffic congestions in one or more areas. The system may also send a list of areas having the identified network traffic congestions and the list of areas may be ranked by congestion severity as indicated by the network performance metric. When the system does not detect network traffic congestions, the system may jump to step 610 or 620 to continue to monitor and analyze the communication network traffic.

In particular embodiments, the system may further optimize network performance to increase the capacity of the communication network in the one or more geographic areas having network traffic congestions. The network performance may be optimized based on one or more performance parameters including, for example, a load balancing factor, a handover, or a throughput. The network performance may be optimized by aggregating communication networks of different carriers or providers. In particular embodiments, the system may further determine a correlation between a network performance degradation and a network traffic status or a network traffic change. In particular embodiments, the system may determine a correlation between a quality of experience metric and a network demand metric and may predict a time for a future network traffic congestion in the one or more geographic areas based on the correlation of the quality of experience metric and the network demand metric. In particular embodiments, the system may determine quality of experience metrics based on a network download speed and network demand metrics based on a request number of download requests.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for detecting network traffic congestions in one or more areas covered by a communication network including the particular steps of the method of FIG. 6, this disclosure contemplates any suitable method for detecting network traffic congestions in one or more areas covered by a communication network including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node #04 corresponding to a particular photo may have a privacy setting specifying that the photo may only be accessed by users tagged in the photo and their friends. In particular embodiments, privacy settings may allow users to opt in or opt out of having their actions logged by social-networking system 760 or shared with other systems (e.g., third-party system 770). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 770, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 762 may be authorization/privacy servers for enforcing privacy settings. In response to a request from a user (or other entity) for a particular object stored in a data store 764, social-networking system 760 may send a request to the data store 764 for the object. The request may identify the user associated with the request and may only be sent to the user (or a computing device or a client system 730 of the user) if the authorization server determines that the user is authorized to access the object based on the privacy settings associated with the object. If the requesting user is not authorized to access the object, the authorization server may prevent the requested object from being retrieved from the data store 764, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

System Overview

Figure 7:
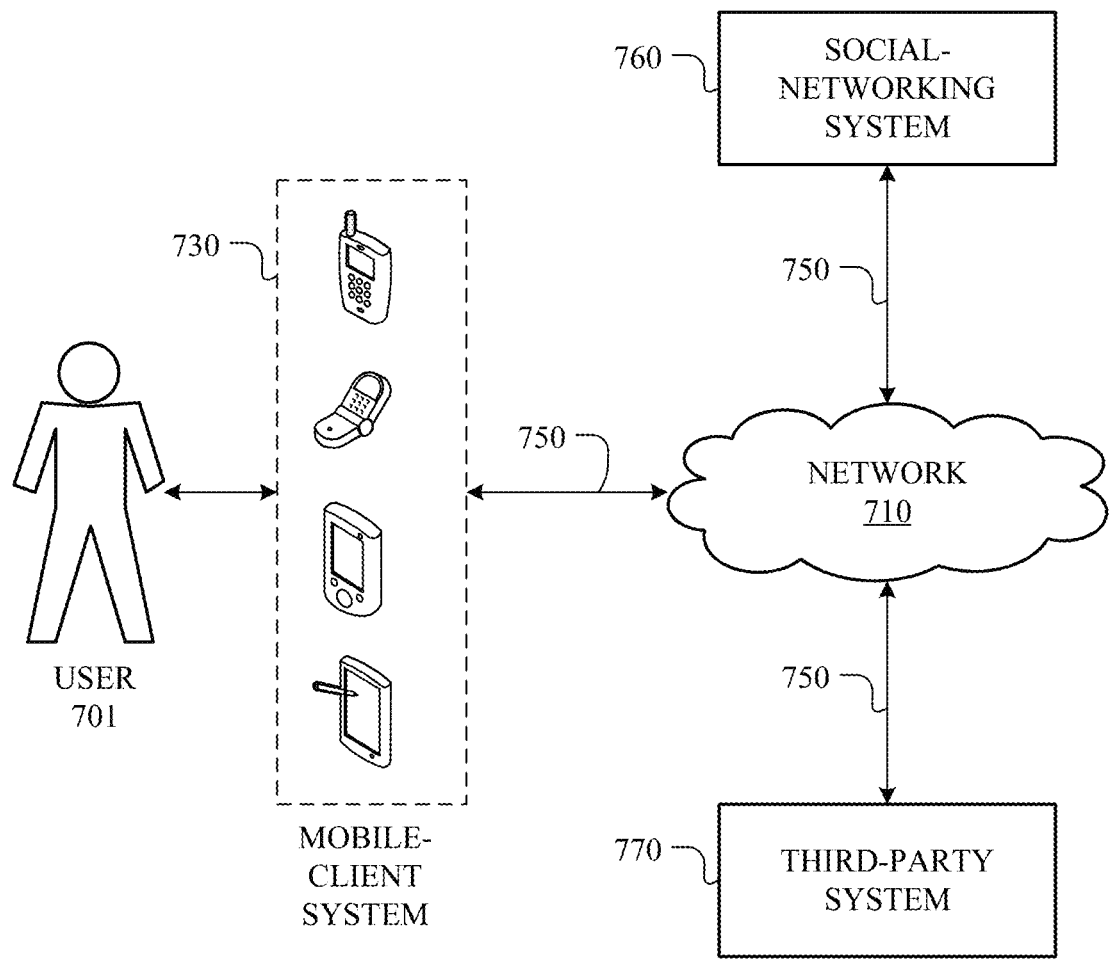
FIG. 7 illustrates an example network environment associated with a social-networking system.

FIG. 7 illustrates an example network environment 700 associated with a social-networking system. Network environment 700 includes a client system 730 (e.g., computing device or client device), a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732 and may have one or more add-ons, plug-ins, or other extensions. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT and JAVA, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. As an example and not by way of limitation, client system 730 may access social-networking system 760 using a web browser 732, or a native application associated with social-networking system 760 (e.g., a mobile social-networking application, a messaging application, another suitable application, or any combination thereof) either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more used-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Systems and Methods

Figure 8:
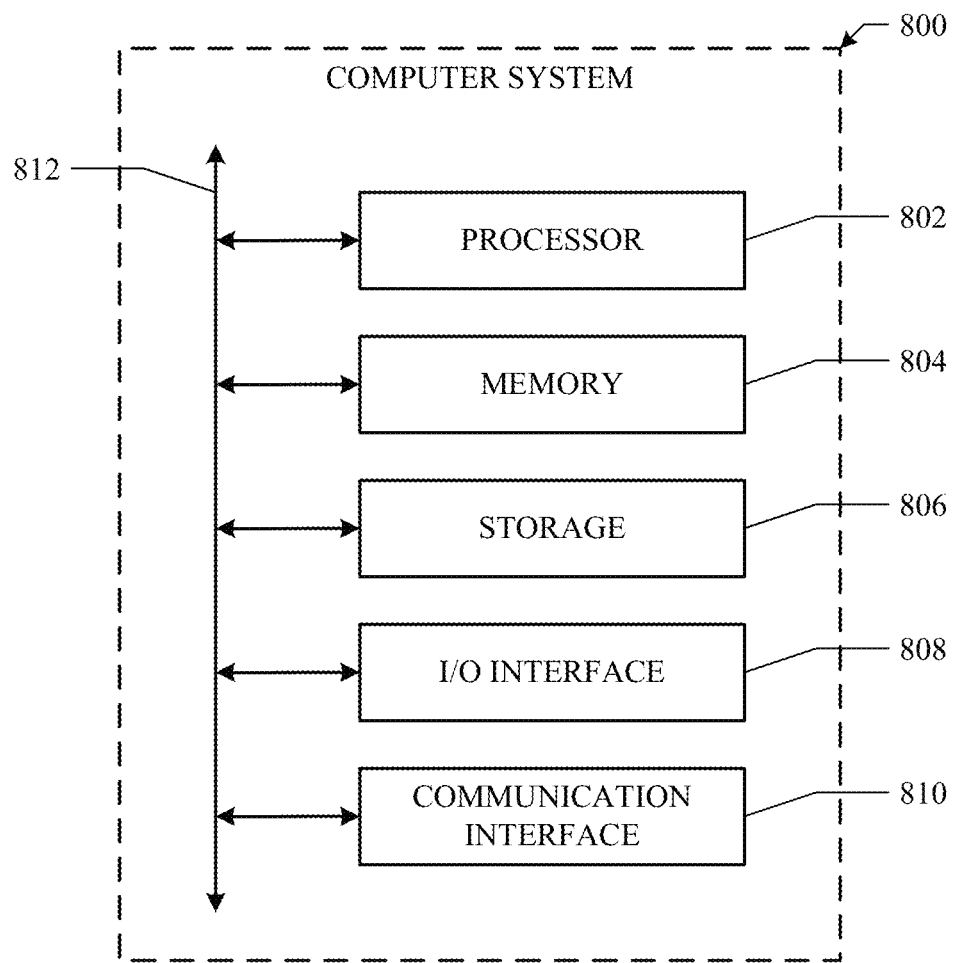
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, memory storage cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   identifying one or more geographic areas covered by a communication network;
   determining, for each geographic area, a congestion metric for the geographic area based at least on a difference between a first and second reference point on a network speed curve, wherein the network speed curve represents download speeds for a volume of traffic in the geographic area;
   identifying one or more network traffic congestions in one or more of the geographic areas based on a comparison of the respective congestion metrics of the geographic areas to a threshold congestion metric; and
   sending, to one or more operators of the communication network, one or more alerts about the identified network traffic congestions.

2. The method of claim 1, wherein the congestion metric is based on a ratio of the difference between the first and second reference points to the first reference point.

3. The method of claim 1, wherein the first reference point is based on the download speed of a busy-hour volume of traffic, and wherein the second reference point is based on the download speed of a non-busy-hour volume of traffic.

4. The method of claim 3, wherein the download speed of the busy-hour volume of traffic is a mean, median, or mode of the download speed of the busy hours, and wherein the download speed of the non-busy-hour volume of traffic is a mean, median, or mode of the of the download speed of the non-busy hours.

5. The method of claim 1, further comprising:
   ranking the one or more geographic areas based on a congestion severity indicated by the respective congestion metrics of the one or more geographic areas; and
   sending the one or more alerts with the one or more geographic areas ranked based on the congestion metrics.

6. The method of claim 1, further comprising:
   filtering the one or more alerts; and
   prioritizing, based on the filtered one or more alerts, an optimization of a network performance to increase a capacity of the communication network in the one or more geographic areas.

7. The method of claim 6, wherein the one or more alerts are filtered by one or more of:
   usage cases;
   congested one or more geographic areas;

one or more geographic areas with coverage issues;
problem devices; or
cost to fix.

8. The method of claim 6, wherein the one or more alerts are filtered based on an occurrence rate of the one or more alerts, and wherein the occurrence rate of the one or more alerts can be determined by taking a ratio of the one or more alerts over a period of time.

9. The method of claim 1, further comprising:
updating an alert database with the one or more alerts about the identified network traffic congestions.

10. The method of claim 1, further comprising:
performing a root cause analysis for the identified network traffic congestions.

11. The method of claim 10, wherein the root cause analysis is performed using a machine learning model that is trained based on historical data of the identified network traffic congestions.

12. The method of claim 1, wherein the threshold congestion metric is determined by a congestion-analysis machine learning model.

13. The method of claim 12, wherein the threshold congestion metric is determined by a classification model or a tree model associated with the congestion-analysis machine learning model trained by manually labeled data, and wherein the threshold congestion metric is adjusted by balancing a precision metric and a recall rate of the identified one or more network traffic congestions.

14. The method of claim 1, wherein the first and second reference points on the network speed curve represent average download speeds for the volume of traffic.

15. The method of claim 14, wherein the average download speed is a first mean download speed in one or more first prior time periods based on a plurality of aggregated download speeds in one or more first prior time periods, and wherein each aggregated speed in the one or more first prior time periods is a second mean download speed in a plurality of days.

16. The method of claim 14, wherein the first average download speed is a first median download speed in one or more first prior time periods based on a plurality of aggregated download speeds in one or more first prior time periods, and wherein each aggregated network speed in the one or more first prior time periods is a second median download speed in a plurality of days.

17. The method of claim 14, wherein the first average download speed is a mean download speed in the one or more first time periods, and wherein the second average download speed is a mean download speed in one or more second time periods.

18. The method of claim 14, wherein the first average download speed is a median download speed in the one or more first prior time periods, and wherein the second average download speed is a median download speed in one or more second prior time periods.

19. One or more computer-readable non-transitory storage media embodying software that is operable when executed to:
identify one or more geographic areas covered by a communication network;
determine, for each geographic area, a congestion metric for the geographic area based at least on a difference between a first and second reference point on a network speed curve, wherein the network speed curve represents download speeds for a volume of traffic in the geographic area;
identify one or more network traffic congestions in one or more of the geographic areas based on a comparison of the respective congestion metrics of the geographic areas to a threshold congestion metric; and
send, to one or more operators of the communication network, one or more alerts about the identified network traffic congestions.

20. A system comprising: one or more non-transitory computer-readable storage media embodying instructions; and one or more processors coupled to the storage media and operable to execute the instructions to:
identify one or more geographic areas covered by a communication network;
determine, for each geographic area, a congestion metric for the geographic area based at least on a difference between a first and second reference point on a network speed curve, wherein the network speed curve represents download speeds for a volume of traffic in the geographic area;
identify one or more network traffic congestions in one or more of the geographic areas based on a comparison of the respective congestion metrics of the geographic areas to a threshold congestion metric; and
send, to one or more operators of the communication network, one or more alerts about the identified network traffic congestions.

* * * * *